(12) United States Patent
Matsuda et al.

(10) Patent No.: US 6,997,453 B2
(45) Date of Patent: Feb. 14, 2006

(54) METHOD OF AND APPARATUS FOR FEEDING SHEETS, IMAGE FORMATION APPARATUS, AND METHOD OF MANUFACTURING GEARS

(75) Inventors: Masanori Matsuda, Kanagawa (JP); Katsuhiko Miki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 140 days.

(21) Appl. No.: 09/928,352

(22) Filed: Aug. 14, 2001

(65) Prior Publication Data
US 2002/0020959 A1 Feb. 21, 2002

(30) Foreign Application Priority Data
Aug. 21, 2000 (JP) .................................. 2000-249953
Jul. 13, 2001 (JP) .................................. 2001-213182

(51) Int. Cl.
*B65H 3/54* (2006.01)

(52) U.S. Cl. .................. 271/122; 271/121; 271/124
(58) Field of Classification Search ............. 271/104, 271/109, 121, 122, 123, 124, 128, 137
See application file for complete search history.

(56) References Cited

U.S. PATENT DOCUMENTS 4,834,568 A * 5/1989 Kagami et al. .......... 400/707.1
5,480,132 A * 1/1996 Kiyohara et al. ........ 271/10.01
5,901,951 A * 5/1999 Yamaguchi ............... 271/10.11
5,947,465 A * 9/1999 Kato et al. ............... 271/10.11
6,042,099 A * 3/2000 Takagishi ..................... 271/2
6,378,858 B1 * 4/2002 Suga ........................ 271/10.01

FOREIGN PATENT DOCUMENTS

| GB | 2 012 727 | * | 8/1979 |
| JP | 5-201571 | | 8/1993 |
| JP | 5-213468 | | 8/1993 |
| JP | 5-330683 | | 12/1993 |
| JP | 6-16271 | | 1/1994 |
| JP | 6-156764 | | 6/1994 |
| JP | 06156782 A | * | 6/1994 |
| JP | 6-263280 | | 9/1994 |
| JP | 06263280 A | * | 9/1994 |
| JP | 8-59003 | | 3/1996 |
| JP | 9-226966 | * | 2/1997 |
| JP | 2000118768 A | * | 4/2000 |

* cited by examiner

*Primary Examiner*—Patrick Mackey
(74) *Attorney, Agent, or Firm*—Oblon, Spivak, McClelland, Maier & Neustadt, P.C.

(57) ABSTRACT

The sheet feeding apparatus feeds sheet media between a feed roller and a separating member pressed into contact with the feed roller, and separates and conveys sheet media held between the feed roller and the separating member one by one by utilizing differences in frictional coefficients between the feed roller, the separating member, and the sheet media. The sheet media are separated and conveyed while periodically changing the pressurizing force of the reverse roller against the feed roller.

18 Claims, 19 Drawing Sheets

METHOD OF AND APPARATUS FOR FEEDING SHEETS, IMAGE FORMATION APPARATUS, AND METHOD OF MANUFACTURING GEARS

FIELD OF THE INVENTION

The present invention relates to a sheet feeding apparatus, an image formation apparatus, a manufacturing method of gears, and a sheet feeding method used in copiers, printers, facsimiles, and printing machines, or the like.

BACKGROUND OF THE INVENTION

As one of sheet feeding-separating mechanisms that feeds paper toward an image forming section by separating sheet media (hereafter called sheet) stacked in a sheet feeding section one by one in an image formation apparatus such as a copier, a printer, a facsimile, or a printing machine, a mechanism of FRR (feed roller—reverse roller) system, so-called a backward separation system has been widely known as a high reliability one. This system performs a sufficient separating function for most of sheets.

In recent years, demands for color images in image formation apparatuses have been increasing. The paper used in these type of apparatuses is the so-called smooth paper that has a high degree of smoothness such as color copy paper used for color copying or paper for second original drawing has been used in many cases.

In these smooth papers, there is thin air layer between two sheets. Therefore, in addition to a frictional force between sheets, an adhesive force between sheets stronger than that of plain paper has been found to act on sheet separation capability when a sheet passes through the mechanism.

In case of the smooth paper having such a strong inter-sheet adhesive force, the sheets cannot properly be separated in the conventional FRR system, which may cause a double feed to occur. In addition, the inter-sheet adhesive force becomes also stronger in sheets with bad quality having a large amount of burrs caused by being improperly cut or in sheets such as second original drawing in which static electricity tend to develop, which may cause a double feed to occur.

To solve the problem, conventionally, a user manually loosens a set of sheets, which is one of the solutions. However, this increases user's work, or damage may be given to sheets depending on how to loosen them, which may cause a paper jam to occur due to folded ends of sheets.

As countermeasures of a machine side against these problems, there are some as disclosed in Japanese Patent Application Laid-Open No. 5-201571, Japanese Patent Application Laid-Open No. 5-213468, and Japanese Patent Application Laid-Open No. 5-330683, in which a separating part is vibrated to increase sheet separating capability. There are also some as disclosed in Japanese Patent Application Laid-Open No. 6-16271 and Japanese Patent Application Laid-Open No. 6-156764, in which sheets are vibrated before the separating part so that the sheets become easier to be separated to some extent before arriving the separating part.

However, any of the above-mentioned references discloses vibrating a component such as a separating part or a guide plate, therefore, there is a disadvantage that the apparatus becomes noisy. Moreover, when the separating part itself is vibrated, there may occur a skew in conveying quality. In addition, generating the vibrations before the sheets reach the separating part makes it difficult for the sheets to transport into the separating part, and a paper jam may occur in some cases.

Structures to adjust variably a pressure contact force between a reverse roller as a frictional separating roller and a feed roller are disclosed in Japanese Patent Application Laid-Open No. 6-263280 and Japanese Patent Application Laid-Open No. 8-59003. However, these inventions require adjusting operation to the pressure contact force whenever a type of paper or an environment is changed in order to obtain an initial separating capability, but the adjusting operation is complicated.

Further, as other countermeasures related to the mechanics, there is one that air is applied to spaces between sheets so that easier separation is prepared beforehand. In this case, a device to apply air is required, which makes the mechanism more complicated, and its arrangement is restricted.

More specifically, in the conventional FRR system, regarding the pressure contact force of the reverse roller against the feed roller, plain paper has no problem because there are a double-feed region where more than two sheets are fed without being separated and a misfeed region where no sheet is fed, and an appropriate region positioned between the double-feed region and the misfeed region is sufficiently wide. However, sheets having a strong inter-sheet adhesive force have a problem such that a double feed or a misfeed may occur due to the inter-sheet adhesive force because the appropriate region between the double-feed region and the misfeed region is narrowed.

SUMMARY OF THE INVENTION

It is an object of this invention to provide a technology that can reliably prevent a double feed irrespective of paper types without producing noise due to vibration.

The sheet feeding apparatus according to one aspect of this invention feeds sheet media in between a feed roller and a reverse roller, that is a roller pressed into contact with the feed roller, is provided by being elastically supported upward by a free end of a cantilever shaft integrally rotating with a driven gear engaging a drive gear and through a torque limiter, and is rotated in a sheet feeding direction or its reverse direction; and which separates and conveys the sheet media held between the feed roller and the reverse roller one by one by utilizing differences in friction coefficients between the feed roller, the reverse roller, and the sheet media. Furthermore, a pressurizing force of the reverse roller against the feed roller is periodically changed by utilizing changes in the moment of the cantilever shaft based on periodical shifting of an engagement position between the driving gear and the driven gear in a longitudinal direction of the shafts supporting these gears.

The sheet feeding apparatus according to another aspect of this invention feeds sheet media in between a feed roller and a reverse roller, that is a roller pressed into contact with the feed roller, is provided by being elastically supported upward by a free end of a cantilever shaft integrally rotating with a driven gear engaging a drive gear and through a torque limiter, and is rotated in a sheet feeding direction or its reverse direction; and which separates and conveys the sheet media held between the feed roller and the reverse roller one by one by utilizing differences in friction coefficients between the feed roller, the reverse roller, and the sheet media. This sheet feeding apparatus further comprises a length variable unit having a variable length, based on such conditions that a position of the engagement part and a rotational direction of the driving gear are determined so that the teeth surfaces of the driven gear undergo an upward force of the pressurizing force by the driving gear based on the engagement part as an action point of force, and the pressurizing force of the reverse roller against the feed roller is periodically changed by varying the length from a fulcrum, that is a cantilever supporting part of the cantilever shaft, to the action point of the force.

The image formation apparatus according to still another aspect of this invention comprises the sheet feeding apparatus according to the above-mentioned aspects; and an image forming unit which forms an image on the sheet media feed by the sheet feeding apparatus.

The manufacturing method of gears according to still another aspect of this invention is a method of manufacturing various gears used in the sheet feeding apparatus according to the above-mentioned aspects.

The sheet feeding method according to still another aspect of this invention comprises the steps of feeding sheet media in between a feed roller and a reverse roller, that is a roller pressed into contact with the feed roller, is provided by being elastically supported upward by a free end of a cantilever shaft integrally rotating with a driven gear engaging a drive gear and through a torque limiter, and is rotated in a sheet feeding direction or its reverse direction; and separating and conveying the sheet media held between the feed roller and the reverse roller one by one by utilizing differences in friction coefficients between the feed roller, the reverse roller, and the sheet media. The sheet feeding method uses a length variable unit with a motor as a driving power source to vary a length, based on such conditions that a pressurizing force of the reverse roller against the feed roller is periodically changed with no stage or with a plurality of stages. A position of the engagement part and a rotational direction of the driving gear are determined so that the teeth surfaces of the driven gear undergo an upward force of the pressurizing force by the driving gear based on the engagement part as an action point, and the pressurizing force is changed by varying the length from a fulcrum, that is a cantilever supporting part of the cantilever shaft, to the action point of the force. The sheet feeding method further comprises the step of controlling operation or non-operation of the length variable unit according to a switching operation.

Other objects and features of this invention will become apparent from the following description with reference to the accompanying drawings.

DESCRIPTION OF THE PREFERRED EMBODIMENTS

Embodiments of the method of and apparatus for feeding sheets, and the method of manufacturing the gears used in the apparatus according to the present invention will be described in detail below while referring to the accompanying drawings.

[1] FRR System According to the Present Invention

[1]-1. Basic Structure

Figure 1:
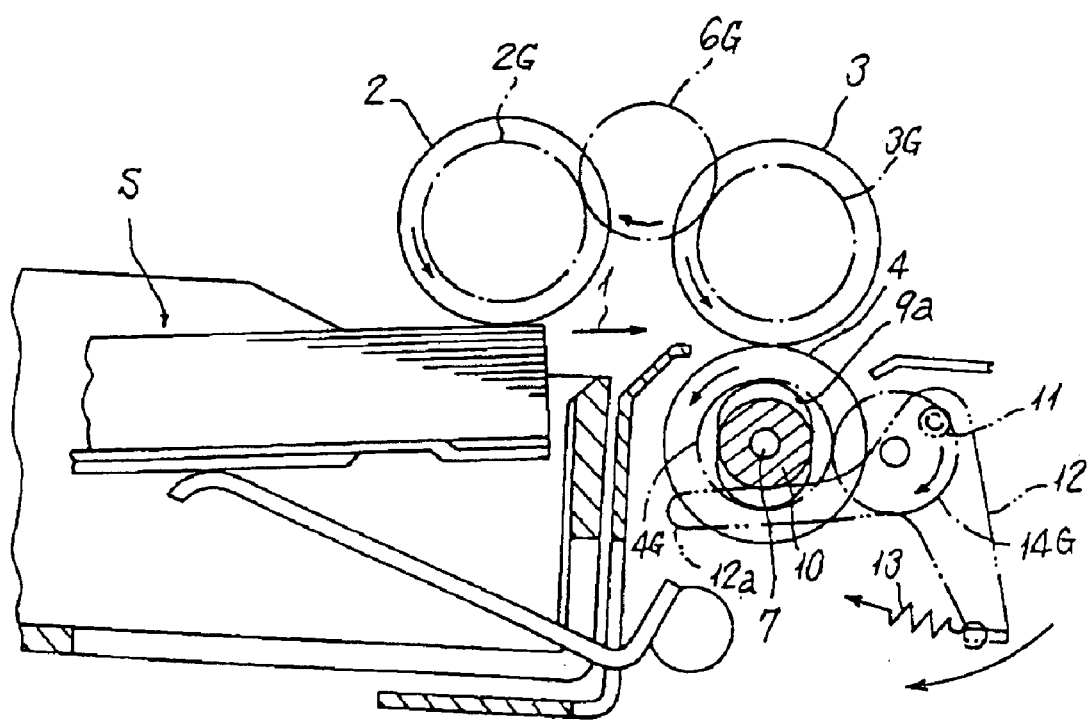
FIG. 1 is a front view of the key section of the sheet feeding apparatus.

The FRR system as a basic feeding mechanism of this invention will be explained below. This embodiment is characterized in that a separating member is a reverse roller that is rotatable in forward or backward direction through a torque limiter. As shown in FIG. 1, a stack of sheets S is aligned along a supporting member which is not shown. It is assumed that the uppermost surface of the stacked sheets can be kept at a constant height even if the amount of sheets is decreased by sheet feeding or supplied sheets are added to the stack of the sheets. Legend 1 refers to a sheet feeding direction, and a pickup roller 2 is in contact with a position of the top of the sheets, by its own weight, on the downstream side of the sheet feeding direction 1, which is a central part of a width direction of the sheet perpendicular to this sheet feeding direction 1.

A feed roller 3 and a reverse roller 4 are disposed opposite to each other and pressed into contact with each other at a position adjacent to the end part of the downstream side of the sheet feeding direction 1 for the stacked sheets S. Further, these two rollers are disposed opposite to the pickup roller 2. The position of a nip part between the feed roller 3 and the reverse roller 4 is set to the same height as that of the uppermost surface of the stacked sheets S.

Figure 2:
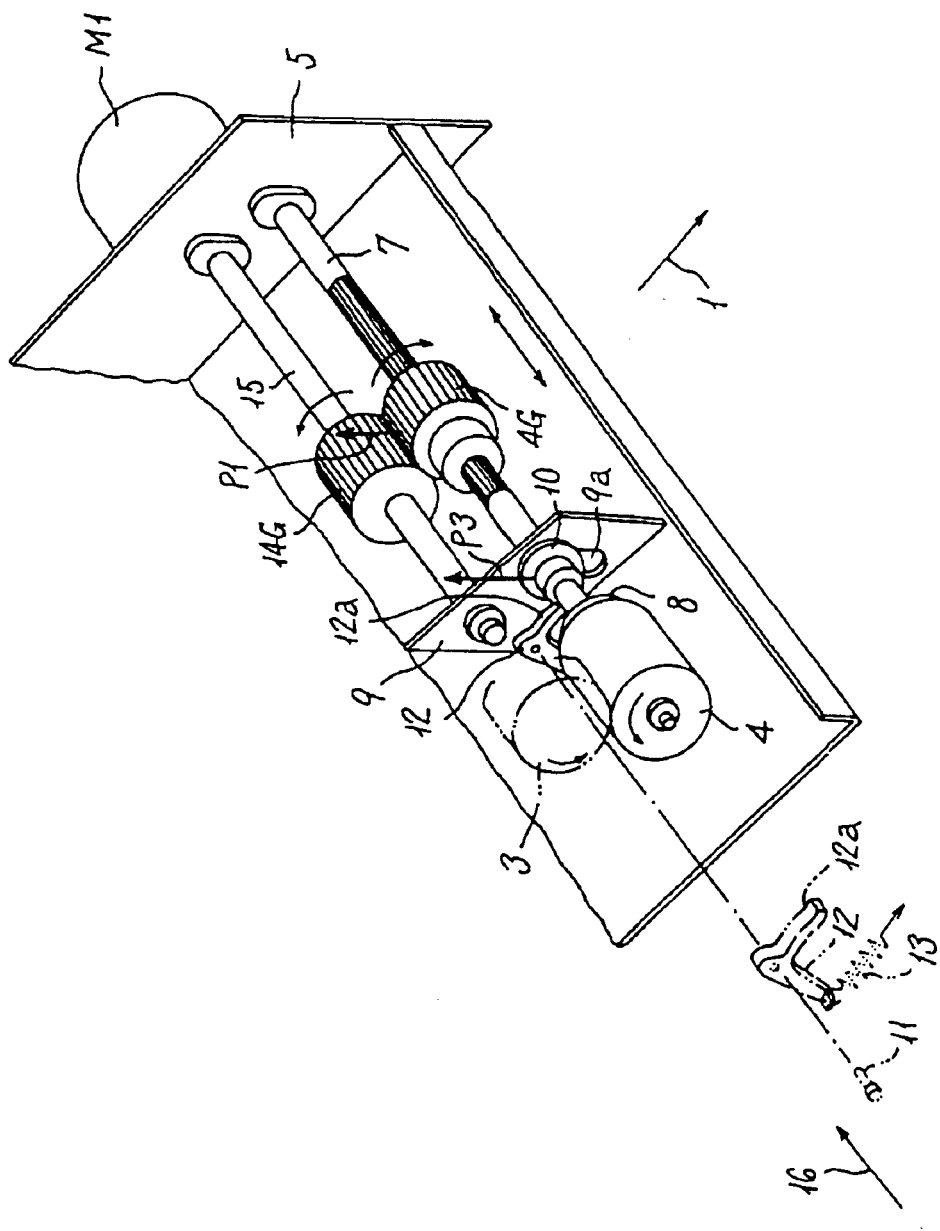
FIG. 2 is a perspective view of the key section of the sheet feeding apparatus.

The feed roller 3 is provided on a feed roller driving shaft, not shown, supported in a cantilever state to a main body frame 5 shown in FIG. 2, and is rotated together with a gear 3G integrally formed on the coaxial shaft with the feed roller driving shaft. This gear 3G is engaged with a gear 2G provided coaxially and integrally with the pickup roller 2 through an idle gear 6G, and the driving force of the gear 3G is conveyed to the gear 2G. The pickup roller 2 and the feed roller 3 are rotated in such a manner in a direction to which a sheet is fed out toward the sheet feeding direction 1.

Figure 3:
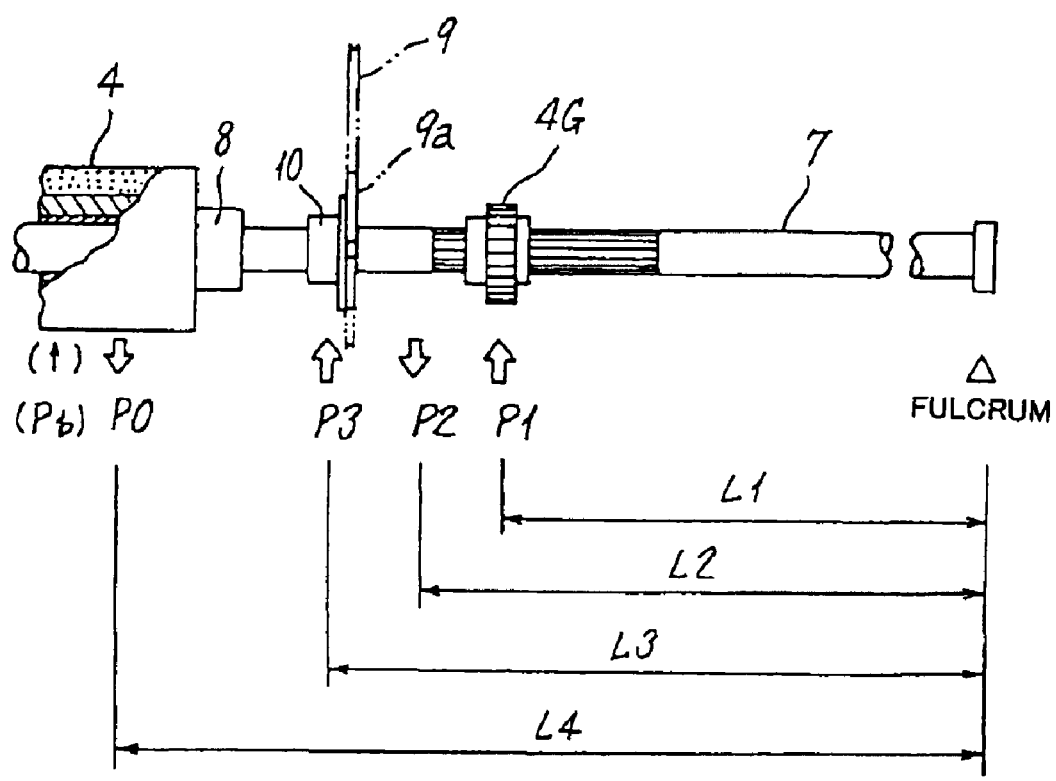
FIG. 3 is a front view of the reverse roller and its supporting shaft.

In FIG. 1, the reverse roller 4 is elastically biased and pressed into contact with a position immediately under the feed roller 3. The reverse roller 4 is supported by a shaft 7 as also shown in FIG. 2 and FIG. 3.

As shown in FIG. 2, the shaft 7 is supported in the cantilever state to the main body frame 5, and the reverse roller 4 is provided in the end side of the cantilever shaft through the torque limiter 8. The shaft 7 passes through a long hole 9a having a length in its vertical direction integrally provided with an auxiliary side plate 9 as a part of the main body frame at a position adjacent to the torque limiter 8. A collar bearing 10 is disposed around a portion where the shaft passes through. This bearing 10 is movable upward and downward along the long hole 9a, so that the shaft 7 is substantially supported in the cantilever state to the main body frame 5.

In FIG. 1 and FIG. 2, a pivoting end 12a of a lever 12, supported by a supporting shaft 11 to the auxiliary side plate 9 so as to be capable of pivoting, is in contact with the bottom surface of the bearing 10 by an elastic force. This elastic force is imparted by the moment due to elasticity of a tightly contracting spring 13 engaged with one end of the lever 12. The reverse roller 4 is biased to the side of the feed roller 3 by the biasing force of this spring 13.

In FIG. 2, a driven gear 4G is disposed at an intermediate position between the torque limiter 8 and the main body frame 5 on the shaft 7 so that the driven gear 4G integrally rotates with the shaft 7. This driven gear 4G is engaged with a driving gear 14G. The driving gear 14G is fixed to a shaft 15 supported between the main body frame 5 and the auxiliary side plate 9. The shaft 15 is applied with a rotational driving force by a motor M1 mounted on the main body frame 5.

In FIG. 1, or when viewed from the direction indicated by an arrow 16 in FIG. 2, the feed roller 3 rotates in a counterclockwise direction as a direction that a sheet is fed to the sheet feeding direction 1. On the other hand, the reverse roller 4 is also structured so that the driving force in the counterclockwise direction is acted by the driving force from the driving gear 14G.

An engagement position between the driven gear 4G and the driving gear 14G is on a virtual plane that passes through respective rotation shaft centers of the gears, so that teeth surfaces of the driven gear 4G undergo an upward force P1 at the engagement part. This upward force P1 and the elasticity of the spring 13 produce an upward biasing force P3 by which the pivoting end 12a of the lever 12 pushes up the bearing 10. This upward biasing force P3 brings the reverse roller 4 into contact elastically with the feed roller 3 with a nip pressure NP. This relation will be expressed as follows: NP=P1+P3.

In FIG. 1 and FIG. 2, both of the pickup roller 2 and the feed roller 3 rotate in a counterclockwise direction so that the sheet S is fed out in a conveying direction 5. The reverse roller 4 is coupled to the shaft 7 through the torque limiter 8, and is integrated with the shaft 7 in a range where a predetermined load exceeds a specified value, and rotates together with the shaft 7. While the reverse roller 4 slips with respect to the shaft 7 in a state where the load is less than the specified value or exceeds the predetermined load. Therefore, the reverse roller 4 rotates together with the feed roller 3 in a state where the loadless than a predetermined torque is put on the reverse roller 4, thus rotating in a clockwise direction.

[1]-2. Separating and Feeding Principles

In FIG. 1 and FIG. 2, the uppermost sheet of the stacked sheets is fed out in the sheet feeding direction 1 by the pickup roller 2 at the time of feeding a sheet. When only one sheet is separated and conveyed, the load on the reverse roller 4 is light. Therefore, the reverse roller 4 is rotated following the rotation of the feed roller 3 to feed the sheet out in the sheet feeding direction 1.

Sometimes a plurality of sheets are fed into the nip part between the feed roller 3 and the reverse roller 4. In such a case, the reverse roller 4 is applied with load to rotate in a reverse direction to the sheet feeding direction 1 through the torque limiter 8, and feeds back the sheet in contact with the reverse roller 4, so that only the uppermost sheet is separated by the feed roller 3 to be fed out in the sheet feeding direction 1.

Figure 4:
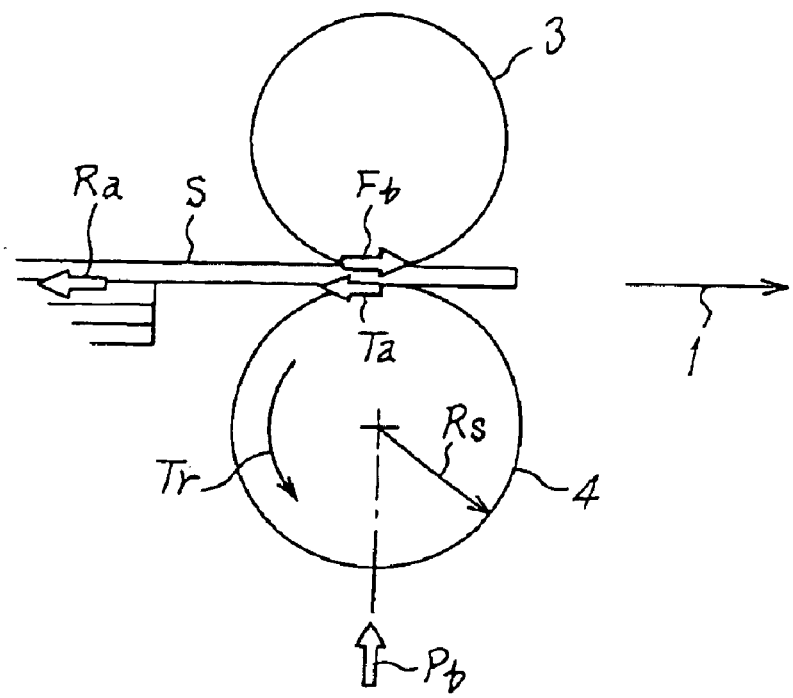
FIG. 4 is an explanatory view schematically showing a relation between the force acting on the nip part and the stacked sheets at the sheet separating and feeding part.
Figure 5:
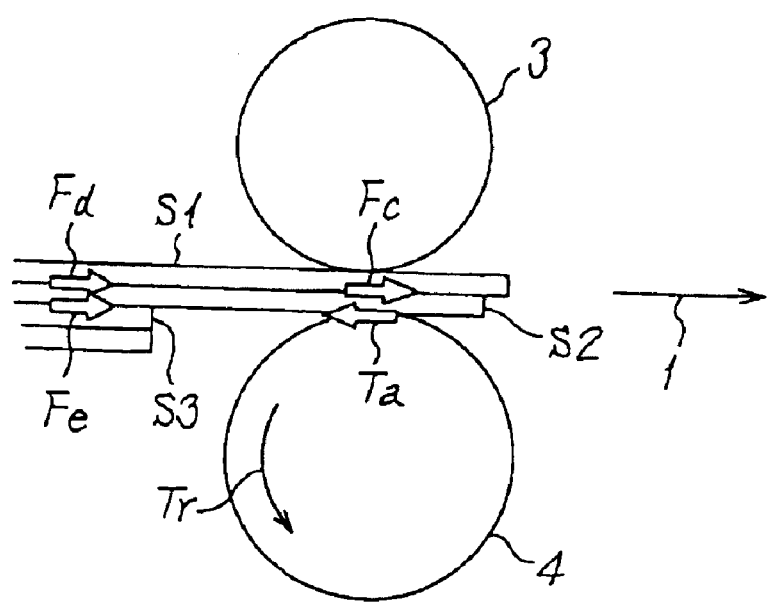
FIG. 5 is an explanatory view schematically showing a relation between the force acting on the nip part and the stacked sheets at the sheet separating and feeding part.

FIG. 4 is an explanatory view of a force acting on a sheet S when this sheet S has proceeded between the feed roller 3 and the reverse roller 4. FIG. 5 is an explanatory view of a force on the side of the reverse roller 4 acting on a sheet S2 when two sheets S1 and S2 have proceeded between the feed roller 3 and the reverse roller 4. In FIG. 4 and FIG. 5, legend Fb represents a sheet feeding force which the feed roller applies to one sheet, legend Fc represents a sheet feeding force which the first sheet applies to the second sheet, legends Fd, Fe represent back resistance between the sheets, legend Tr represents torque of the torque limiter, legend Ta represents a backward force of the torque limiter, legend Pb represents a pressurizing force of the reverse roller that pressurizes the feed roller at the time of driving the reverse roller, legend Ra represents an inter-sheet resistance, and legend Rs represents a diameter of the reverse roller.

The condition of feeding one sheet is Fb>Ta+Ra in FIG. 4. Assuming that m is a mass of one sheet, $\mu r$ is a friction coefficient between the roller and the sheet, and $\mu p$ is a friction coefficient between sheets, the equations as follows are obtained: Fb=$\mu r$·Pb, Ra=$\mu p$·m, Ta=Tr/Rs. Therefore, the condition can be expressed by the following equation:

$$Pb > (1/\mu r) \cdot Ta + (\mu p/\mu r) \cdot m \tag{1}$$

The condition of feeding a second sheet is Ta>Fc+Fd+Fe based on FIG. 5. Since it is determined that Fc=$\mu p$·Pb, Fd=$\mu p$·m, Fe=$\mu p$·2m, the condition can be expressed by Ta>p·(Pb+3m). This equation is modified to obtain the following equation:

$$Pb<(1/\mu p)\cdot Ta-3m \quad (2)$$

If between the condition equations of the equations 1 and 2, that is, both of the conditions of the equations 1 and 2 are satisfied, only one sheet can be separated and fed. When the range where these conditions are satisfied is referred to as an adequate range for sheet feeding, the adequate range for sheet feeding can be expressed by the following equation:

$$(1/\mu p)\cdot Ta-3m>Pb>(1/\mu r)\cdot Ta+(\mu p/\mu r)\cdot m \quad (3)$$

Figure 6:
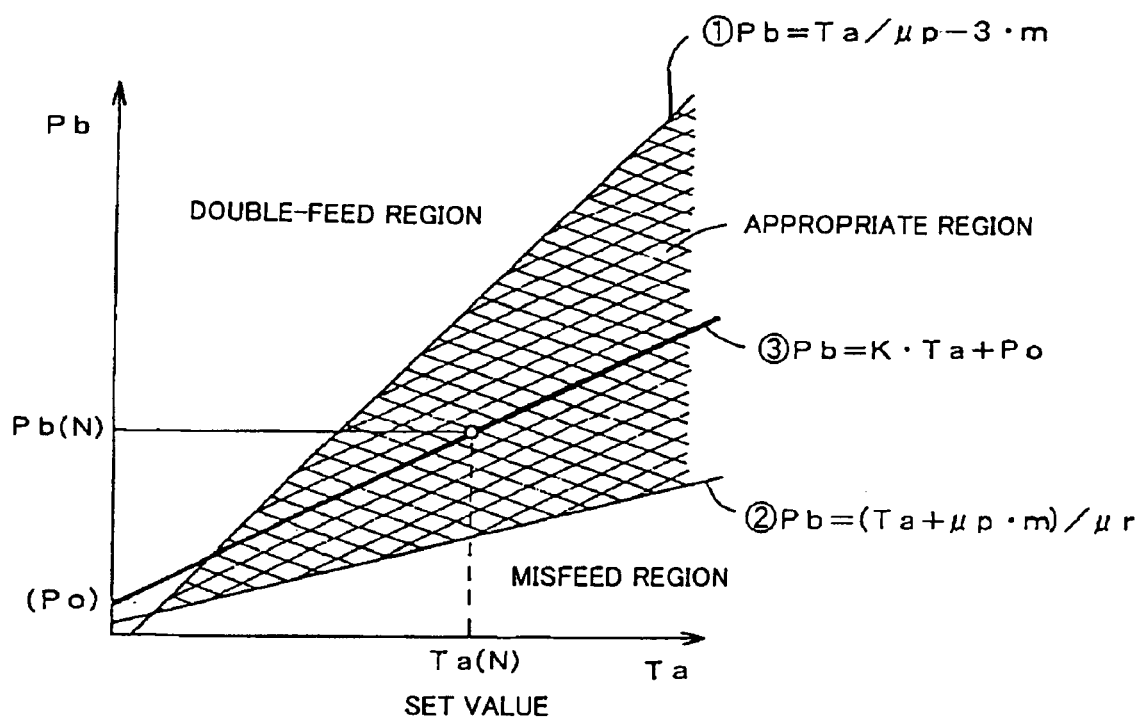
FIG. 6 is a specially prepared diagram showing a relation between the pressurizing force by the reverse roller and the backward force of the torque limiter.

In FIG. 6, a region above the line (1) of $Pb=Ta/\mu p-3\cdot m$ is a double-feed region, while a region under the line is where double feeds do not occur. A region under the line (2) of $Pb=(Ta+\mu p\cdot m)/\mu r$ is a misfeed region, while a region above the line is where misfeeds do not occur.

Therefore, the region sandwiched by the line (1) and line (2) is defined as an appropriate region where neither double feeds nor misfeeds occur. On the other hand, it is known that the relational equation between the reverse roller pressure Pb and the backward force of the torque limiter Ta is simply expressed by the following equation 4. Therefore, this equation 4 can be represented by the line (3) in the appropriate region of FIG. 6.

$$Pb=K\cdot Ta+Po \quad (4)$$

Where,

Po: a reverse roller pressure when the reverse roller is not driven, $K=(Rs/Rz)\cdot(L1/L4)$, Rz: a diameter of a pitch circle of a driven gear, Rs: a diameter of the reverse roller 4, L1: a length from a fulcrum to an engagement part between the driving gear 14G and the driven gear 4G, and L4: a length from a fulcrum to a center of the reverse roller 4.

The shaft 7 in FIG. 1 and FIG. 2 is supported by the main body frame 5 in a cantilever state, therefore, a pushing-up force P1 at the gear engagement part between the driving gear 14G and the driven gear 4G when the reverse roller is not operated is zero considering the moment balance based on a supporting part with respect to the main body frame 5 as a fulcrum as shown in FIG. 3. Therefore, the equation of $Po=1/L4\cdot(L3\cdot P3-L2\cdot P2)$ holds.

Where,

P2: a weight of the shaft 7, the driven gear 4G accompanying the shaft 7, and the reverse roller 4, L2: a length from a fulcrum to a barycenter of weight part of P2, P3: a pressurizing force by the lever 12, and L3: a length from a fulcrum to a pressurizing point by the lever 12.

Figure 8:
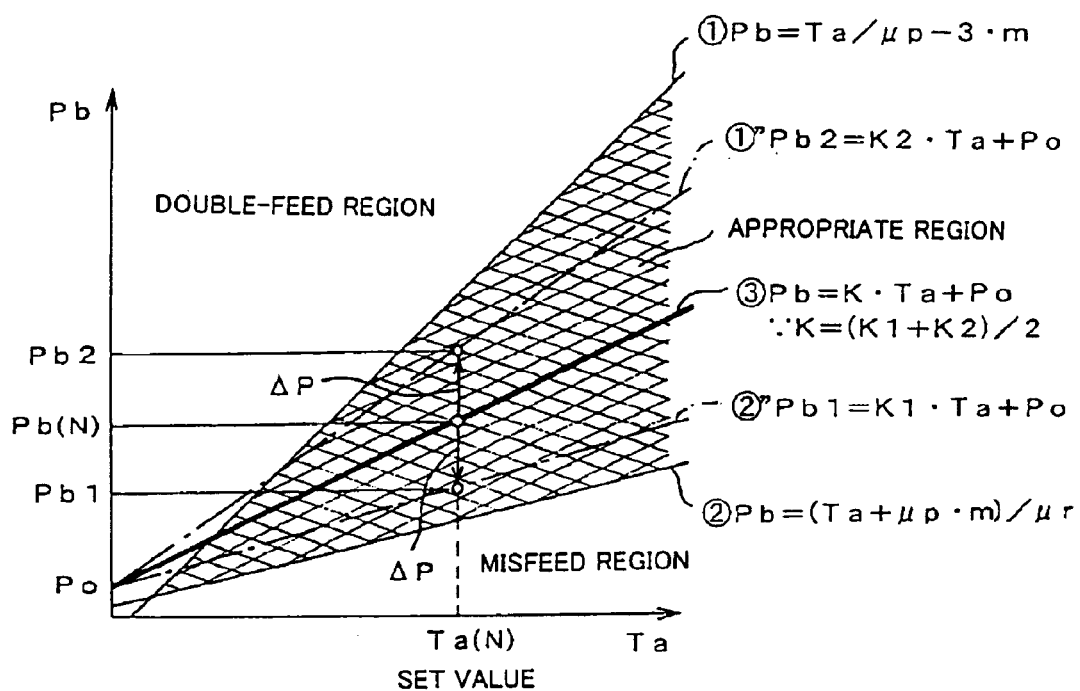
FIG. 8 is a specially prepared diagram showing a relation between the pressurizing force by the reverse roller and the backward force of the torque limiter.
Figure 9:
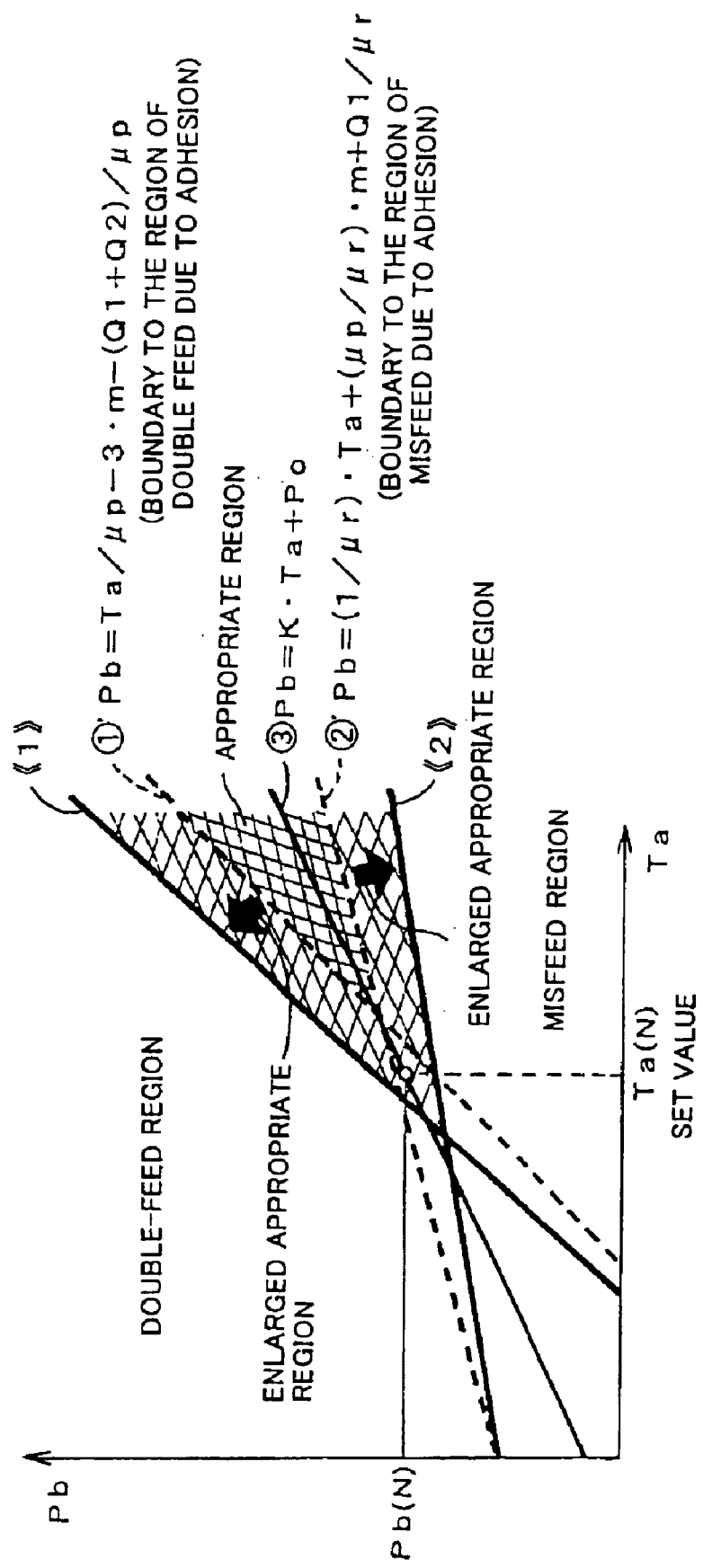
FIG. 9 is a specially prepared diagram showing a relation between the pressurizing force by the reverse roller and the backward force of the torque limiter.

Based on the condition, if the range where the backward force of the torque limiter in the equation 4 is set is a value of Pb in the range where the inequality of the equation 3 is satisfied, the sheet feeding is in the appropriate region of FIG. 8, where stable separation and feeding of sheets can be performed.

However, when an adhesive force acts on the sheet, Pb in the equation 3 is included in a range as shown in the equation 5 explained below, so that the appropriate region for sheet feeding is narrowed. Resultantly, a double feed or a misfeed may occur with the conventional set value Ta (N) of the torque limiter.

$$(1/\mu p)\cdot Ta-3m-(Q1+Q2)/\mu p>Pb>(1/\mu r)\cdot Ta+(\mu p/\mu r)\cdot m+Q1/\mu r \quad (5)$$

Where,

Q1: adhesive force, for example, between the first sheet S1 and the second sheet S2 in FIG. 5, and Q2: adhesive force, for example, between the second sheet S2 and the third sheet S3 in FIG. 5.

Figure 7:
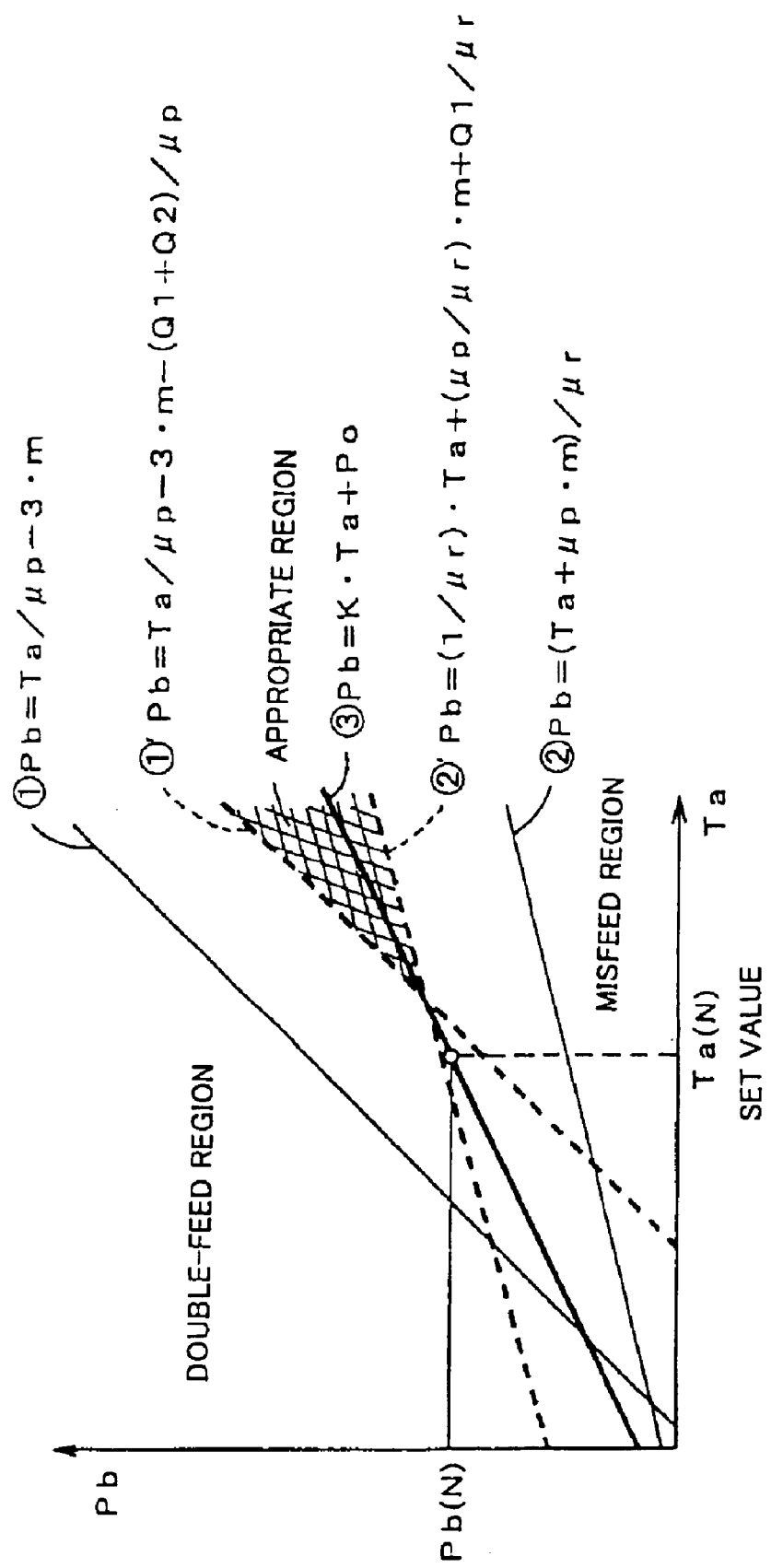
FIG. 7 is a specially prepared diagram showing a relation between the pressurizing force by the reverse roller and the backward force of the torque limiter.

This relation is schematically shown in FIG. 7. The line (1) in FIG. 6 becomes the line (1)' that represents the contents of a linear equation: $Pb=Ta/\mu p-3\cdot m-(Q1+Q2)/\mu p$, whose slope shifts downward in parallel with the slope of the line (1). Further, the line (2) in FIG. 6 becomes the line (2)' that represents the contents of a linear equation:

$Pb=(1/\mu r)\cdot Ta+(\mu p/\mu r)\cdot m+Q1/\mu r$, whose slope shifts upward in parallel with the slope of the line (2).

Therefore, the appropriate region in FIG. 6 is narrowed in FIG. 7, so that the value of Pb, which is well-included in the appropriate region at the set value Ta (N) of the return pressure of the torque limiter in FIG. 6, is out of the appropriate region in FIG. 7 although the value is the same, which causes a double feed or a misfeed to occur.

If the value of Pb is periodically changed, with the set pressure of the torque limiter left as it is, to enable setting so that (A) the value will be under the line (1)' at a certain point in time and (B) the value will be above the line (2)' at a subsequent point in time, it is possible to obtain such a state that a double feed will not occur at the time (A) (although there may occur a misfeed depending on the value of Pb) or a misfeed will not occur at the time (B) (although there may occur a double feed depending on the value of Pb).

To periodically change the value of Pb, that is, the pressurizing force of the reverse roller 4 against the feed roller 3 indicates that two points in time alternate, that is, the point in time at which a double feed does not occur and the point in time at which a misfeed does not occur alternate, even if the set value of the torque limiter for plain paper, for example, Ta (N) is kept constant without any change. The sheet is eventually separated and conveyed.

Therefore, when smooth paper or second original drawing that has a strong inter-sheet adhesive force is fed under the situation that the set value Ta (N) of Ta (See FIG. 6) satisfying the condition of a normal feeding for plain paper is left as it is, such special paper can be also separated and fed if the value of Pb can be alternately set to values so as to periodically satisfy the conditions of (A) and (B) even if the value is out of the appropriate region due to the inter-sheet adhesive force as shown in FIG. 7.

It is comparatively easier that the pressurizing force Pb of the reverse roller against the feed roller is periodically changed as compared to a case where the set pressure of the torque limiter is changed. Therefore, it is possible to reliably separate and feed the special paper such as smooth paper used for color copying, second original drawing, or OHP sheets just as is the case of the plain paper by a simple unit that changes a pressurizing force Pb.

In the equation 4, the pressurizing force Pb is a function of K. Since K is a function of L1, periodical variation of L1 can satisfy the conditions of (A) and (B).

Accordingly, by varying only L1 equally in a direction to which the length is extended and a direction to which the length is reduced without changing another conditions, it is possible to obtain features of the line (1)" and the line (2)" divided by the line 3 in FIG. 8.

The condition required for normal separation and feeding of plain paper is shown by the line (3) in FIG. 6 and FIG. 7. If the pressurizing force of the reverse roller against the feed roller is varied by Δp each in respective directions to which the force increases and decreases equally with respect to Pb(N) corresponding to the set value Ta(N) without changing the set value Ta(N) of the torque limiter at that time, the pressurizing force that has decreased by Δp than the pressurizing force Pb(N) is Pb1, and the pressurizing force that has increased by Δp than the pressurizing force Pb(N) is Pb2 as shown in FIG. 8. The respectively corresponding lines are indicated by (1)" and (2)" to obtain the equation 6 and equation 7.

$$Pb1 = K1 \cdot Ta + Po \quad (6)$$

$$Pb2 = K2 \cdot Ta + Po \quad (7)$$

Figure 10:
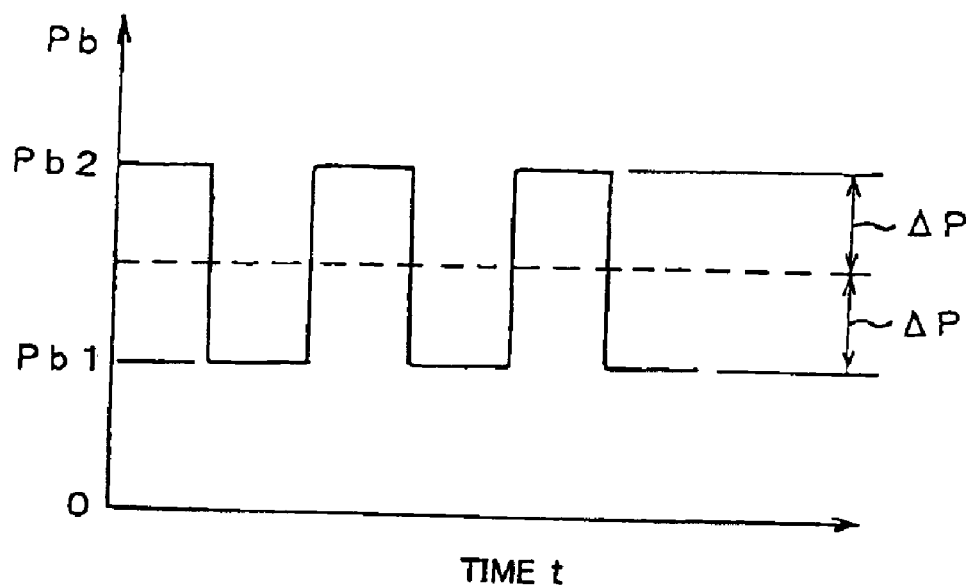
FIG. 10 is an explanatory view of periodical fluctuation mode of the pressurizing force by the reverse roller.
Figure 11:
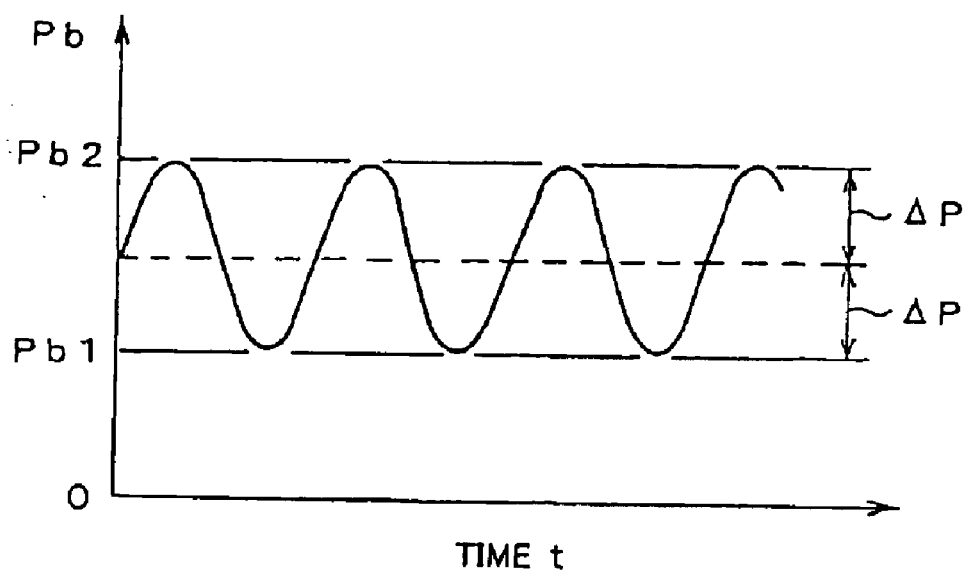
FIG. 11 is an explanatory view of periodical fluctuation mode of the pressurizing force by the reverse roller.

That is, the pressurizing force of the reverse roller against the feed roller fluctuates periodically between Pb1 and Pb2. The mode of this fluctuation includes square wave-like fluctuations as shown in FIG. 10 and sine-curved fluctuations as shown in FIG. 11. The straight line passing through the center of these waves is expressed by the equation 8, which is the equation indicated by the line (3) in FIG. 6 to FIG. 8.

$$Pb = K \cdot Ta + Po \text{ (because } K = (K1+K2)/2) \quad (8)$$

The fluctuation width Δp of the pressure is as follows:

$$\Delta P = (Pb2 - Pb1)/2 = (K2 - K1) \cdot Ta/2 \quad (9)$$

In FIG. 8, it is apparent that the equation (6) is effective on the double feed side and the equation (7) is effective on the misfeed side.

Based on the equation 3, following equation can be determine:

$$Pb2 > (1/\mu r) \cdot Ta + (\mu p/\mu r) \cdot m$$

and based on Pb2=Pb+Δp, the equation can be modified as $$Pb + \Delta P > (1/\mu r) \cdot Ta + (\mu p/\mu r) \cdot m$$

and then the following equation is obtained:

$$Pb > (1/\mu r) \cdot Ta + (\mu p/\mu r) \cdot m - (K2-K1) \cdot Ta/2 \quad (10)$$

Likewise, Based on the equation 3, following equation can be determine:

$$Pb1 < (1/\mu p) \cdot Ta - 3m$$

and based on Pb1=Pb−ΔP, the equation can be modified as $$Pb - \Delta P < (1/\mu p) \cdot Ta - 3m$$

and then the following equation is obtained:

$$Pb < (1/\mu p) \cdot Ta - 3m + (K2-K1) \cdot Ta/2 \quad (11)$$

Therefore, the appropriate region for sheet feeding is expressed as follows:

$$(1/\mu p) \cdot Ta - 3m + (K2-K1) \cdot Ta/2 > Pb > (1/\mu r) \cdot Ta + (\mu p/\mu r) \cdot m - (K2-K1) \cdot Ta/2 \quad (12)$$

This indicates that the range of the appropriate region is enlarged and allowance for double feeds and misfeeds is increased, which makes it possible to improve sheet feeding capability.

The relational equation considering the inter-sheet adhesive force is as follows:

$$(1/\mu p) \cdot Ta - 3m - (Q1+Q2)/\mu p + (K2-K1) \cdot Ta/2 > Pb > (1/\mu r) \cdot Ta + (\mu p/\mu r) \cdot m + Q1/\mu r - (K2-K1) \cdot Ta/2 \quad (13)$$

In the same manner as the case where the appropriate region is enlarged vertically with respect to the line (3) in FIG. 8 within the range between the lines (1)" and (2)", respective ranges of the appropriate region for sheet feeding are enlarged, as shown by crosshatch, with the line <<1>> obtained by enlarging the range upward with respect to the line (1)' and with the line <<2>> obtained by enlarging the range downward with respect to the line (2)' in FIG. 7. Accordingly, allowance for the range where double feeds and misfeeds do not occur is increased, which makes it possible to improve sheet feeding capability.

[2] Means to Periodically Change Pb

As shown in the equation 4, the pressurizing force Pb is a function of the length L1 from the fulcrum to the engagement part between the driving gear 14G and the driven gear 4G. Therefore, by periodically varying the length L1, the pressurizing force Pb can periodically be changed.

Referring to the examples in FIG. 2 and FIG. 3, this length L1 is a length from the fulcrum as a cantilevered-support part of the cantilever shaft 7 to an action point of force as an engagement part between the driving gear 14G and the driven gear 4G. The length L1 can be varied periodically by using a simple unit such as a length variable unit as explained below.

By periodically changing the pressurizing force Pb by such a simple unit as the length variable unit, it is possible to reliably separate and feed special paper such as smooth paper that has an inter-sheet adhesive force stronger than that of the plain paper.

That is, in respective examples explained below, basically, by utilizing changes in the moment of the cantilever shaft 7 supporting the reverse roller 4 through periodical shifting of the engagement position between the driving gear 14G and the driven gear 4G in the longitudinal direction of the shafts supporting these gears, the pressurizing force of the reverse roller 4 against the feed roller 3 is periodically varied. A corresponding gear to the driving gear 14G includes a driving gear pair 14G3 explained below, while a corresponding gear to the driven gear 4G includes driven gear pairs 4G3, 4G4, 4G4', 4G5, and 4G6 as explained below.

[2]-1. Length Variable Unit Integral with Gears

Each example explained below in [2]-1a to 1d shows a structure of the length variable unit integral with the driving gear 14G or the driven gear 4G in FIG. 1 to FIG. 3. Based on this structure, since the length variable unit is integral with the driving gear 14G or the driven gear 4G, in response to rotation of the driving gear 14G or the driven gear 4G by driving the motor M1 as a driving source in the conventional manner, the length variable unit is brought into function because any particular driving unit is not required, and the pressurizing force Pb is periodically changed.

Accordingly, there is an advantage that the pressurizing force can be periodically changed without using any particular driving unit.

[2]-1a. Length Variable Unit Structured with Only Gears

EXAMPLE 1

Figure 12:
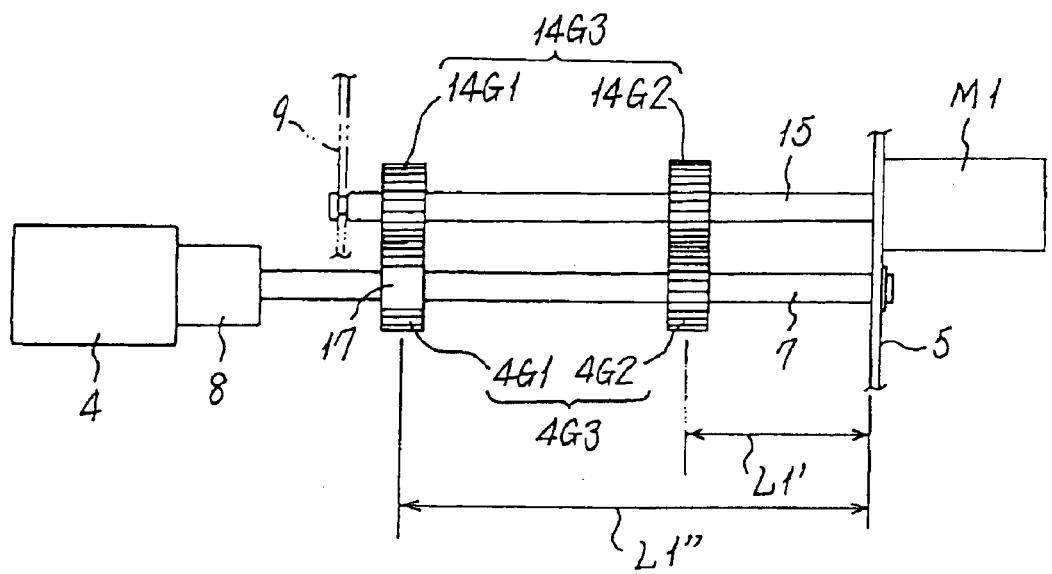
FIG. 12 is a plan view showing an example of the length variable unit.

Structure with a Gear Pair Which has a Relation that Teeth-omitted Portions are Complemented by Each Other The structure will be explained with reference to FIG. 12 to FIG. 14B. FIG. 12 corresponds to the figure when the structure in FIG. 2 is viewed from the top. Regarding to the reverse roller 4, main body frame 5, torque limiter 8, shaft 7, shaft 15, and the motor M1 in FIG. 2, the members corresponding to these components are indicated by the same legends also in FIG. 12 for convenience in explanation.

The length variable unit in this example comprises the driving gear pair 14G3 composed of two gears 14G1 and 14G2 that are spaced on the shaft 15 as a driving-gear supporting shaft that supports the driving gears, and the driven gear pair composed of gears 4G1 and 4G2 spaced on the shaft 7 as a driven-gear supporting shaft that supports the driven gears.

Figure 13:
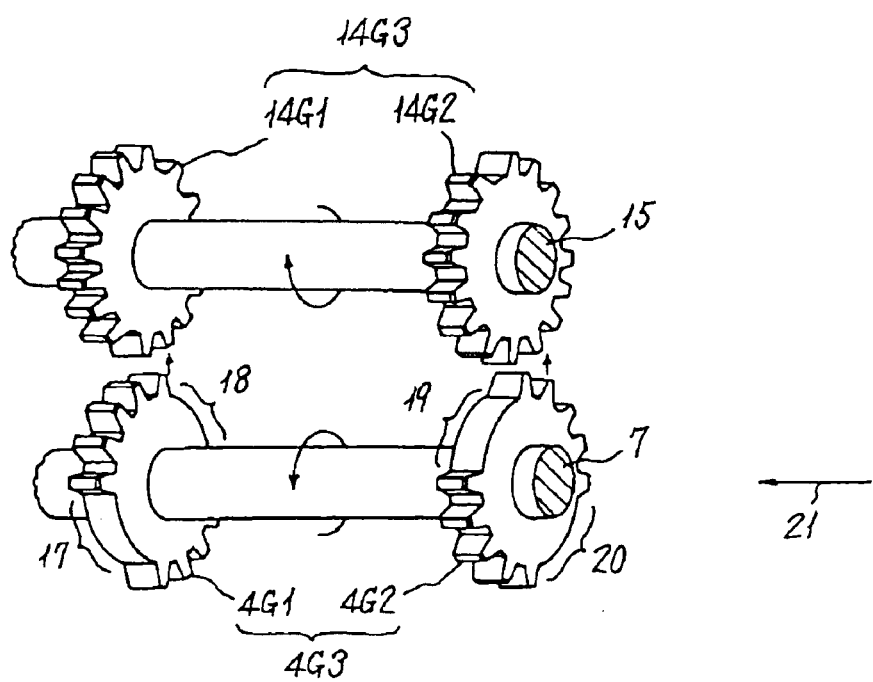
FIG. 13 is an exploded perspective view of the driving gear and the driven gear.
Figure 14:
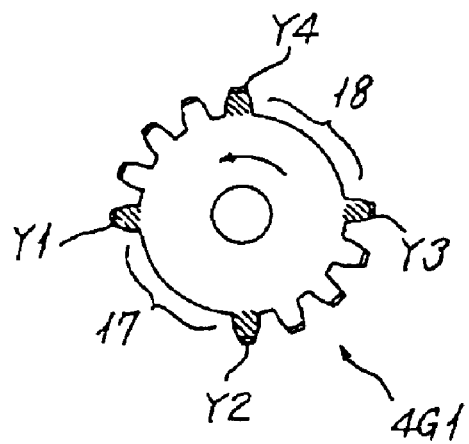
FIG. 14A is a simulated view of the gear in the rear side when the driving gear in FIG. 13 is viewed from the direction indicated by the arrow 21.
FIG. 14B is a simulated view of the gear in the front side when the driving gear in FIG. 13 is viewed from the direction indicated by the arrow 21.
Figure 14:
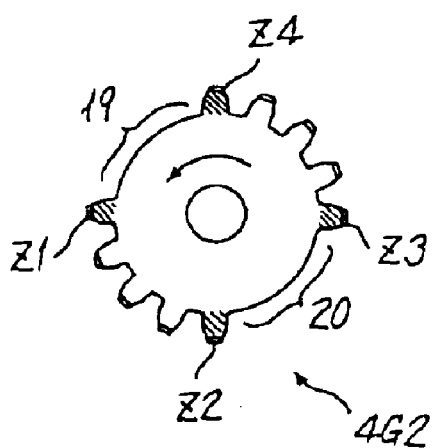

As shown in FIG. 13, the gears 4G1 and 4G2 forming the driven gear pair 4G3 are teeth-omitted gears each of which has portions, where teeth are omitted, on its circumference i.e. teeth-omitted portions, and the teeth-omitted gears are arranged so that their teeth-omitted portions are complemented by each other.

That is, regarding the gear 4G1, the teeth-omitted portion 17 and the teeth-omitted portion 18, each of which corresponds to ¼ of its circumference, are disposed opposite to each other. Likewise, regarding the gear 4G2, the teeth-omitted portion 19 and the teeth-omitted portion 20, each of which corresponds to ¼ of its circumference, are disposed opposite to each other.

Further, when these gears 4G1 and 4G2 are viewed from the longitudinal direction of the shaft 7 as indicated by the arrow 21 in FIG. 13, they have such relations that the teeth-omitted portion 18 is positioned next to the teeth-omitted portion 19, the teeth-omitted portion 20 is positioned next to the teeth-omitted portion 18, the teeth-omitted portion 17 is positioned next to the teeth-omitted portion 20, and the teeth-omitted portion 19 is positioned next to the teeth-omitted portion 17, so that these teeth-omitted portions are complemented by each other. On the other hand, the gears 14G1 and 14G2 forming the driving gear pair 14G3 are formed with gears along which even-pitch teeth are provided.

The gears 4G1 and 4G2 spaced from each other have such a relation that their teeth-omitted portions are complemented by each other in such a manner as explained above. Therefore, during rotation of the shaft 15 in FIG. 12, the gear 14G2 of the driving gear pair 14G3 and the gear 4G2 of the driven gear pair 4G3 are periodically brought into engagement, and the gear 14G1 of the driving gear pair 14G3 and the gear 4G1 of the driven gear pair 4G3 are also periodically brought into engagement.

This means that a length corresponding to the length L1, from the position of the main body frame 5 corresponding to the fulcrum in FIG. 8 to the engagement position between the gears, is varied, which results in change of the length corresponding to the length L1 from the length L1' to the length L1". Accordingly, it is possible to obtain a change in the pressurizing force Pb corresponding to the quantity of change of this length. The length L1 in FIG. 3 is periodically varied in such a manner, which makes it possible to periodically change the pressurizing force Pb between the pressurizing forces Pb1 to Pb2 as shown in FIG. 10 without requiring a particular driving unit. The cycle of this pressure fluctuation is determined by a rotational speed of the driven gear pair 4G3 and the number of teeth-omitted portions along its circumference.

In this example, the gear with teeth-omitted portions is provided on the side of the shaft 7, and the gear with even-pitch teeth is provided on the side of the shaft 15. However, the gears may not be provided in such a manner, but the teeth-omitted gear may be provided on the side of the shaft 15 and the gear with even-pitch teeth may be provided on the side of the shaft 7.

For example, if the two gears 4G1 and 4G2 each of which has teeth-omitted portions are discretely provided gears, it is required to first assemble the gear 4G1, and adjust engagement of the gear 4G2 with the gear 4G1 so that these gears have a relation that the gear of this gear 4G1 is complemented by the teeth-omitted portions, thus this assembly work is complicated.

Referring to this point, when the gear 4G1 and the gear 4G2 each of which has teeth-omitted portions are integrated as the driven gear pair 4G3, an assembly work is easy because it is carried out by one process that does not require the adjustment work. Since the accurate complemental relation is insured, noise caused by displacement of the engagement position does not possibly occur. As explained above, by integrally manufacturing the teeth-omitted gears in which the teeth-omitted portions are complemented by each other, the assembly work is easy. However, this does not mean that integral manufacturing of a gear pair which is not teeth-omitted gears, the driving gear pair 14G3 in this example, is denied.

Although two teeth-omitted portions are provided along the circumference of the gear in the example of FIG. 13, one portion may naturally be provided, and a large number of teeth-omitted portions more than two portions may be structured.

Regarding the number of teeth-omitted portions, a nip part between conveying rollers 87, 88, that is positioned at a place the nearest to the downstream side in the sheet conveying direction as compared to the nip part between the feed roller 3 and the reverse roller 4 in FIG. 25 explained later, has no sheet separating function. Therefore, a time required for sending the tip end of a sheet for the length between both of the nips becomes a sheet separation capable time in which a sheet can be separated at the nip part between the feed roller 3 and the reverse roller 4. By increasing the number of changes in the pressurizing force Pb within the sheet separation capable time, the separating capability is improved. Therefore, if two or more teeth-omitted portions are provided along the circumference of the gear, the number of variations of the length per rotation increases more than that of the conventional one, which is preferable for a sheet separating capability. When a sheet is present at the nip part between the feed roller 3 and the reverse roller 4, a larger number of fluctuations in the pressurizing force Pb as the length is varied makes the separating effect increase more.

In this example, although each of the driven gear pair 4G3 and the driving gear pair 14G3 is formed with two gears spaced from each other, three gears spaced from each other may be grouped, or more of three gears may be grouped.

Further, when these gears 4G1 and 4G2 are viewed from the longitudinal direction of the shaft 7 as indicated by the arrow 21 in FIG. 13, the gear 4G1 is shown in FIG. 14A and the gear 4G2 is shown in FIG. 14B. The tooth Z1 next to the teeth-omitted portion 19 on the gear 4G2 is simultaneously engaged with the gear 14G2 provided opposite thereto, and the tooth Y1, of the teeth next to the teeth-omitted portions 17 and 18 on the gear 4G1, that is at the position of the nearest phase to the tooth Z1 is simultaneously engaged with the gear 14GI provided opposite thereto. Likewise, the tooth Y2 and the tooth Z2, the tooth Y3 and the tooth Z3, and the tooth Y4 and the tooth Z4 are also simultaneously engaged with the gears 14G2 and 14G1, respectively.

Each of these teeth Y1 to Y4 and the teeth Z1 to Z4 corresponds to a tooth at a part where drive transmission is switched, so that impact at the time of switching engagement is low under the condition that at least one tooth overlaps one another, thus being advantageous against noise.

EXAMPLE 2

Length Variable Unit Formed with a Single Gear

Figure 15:
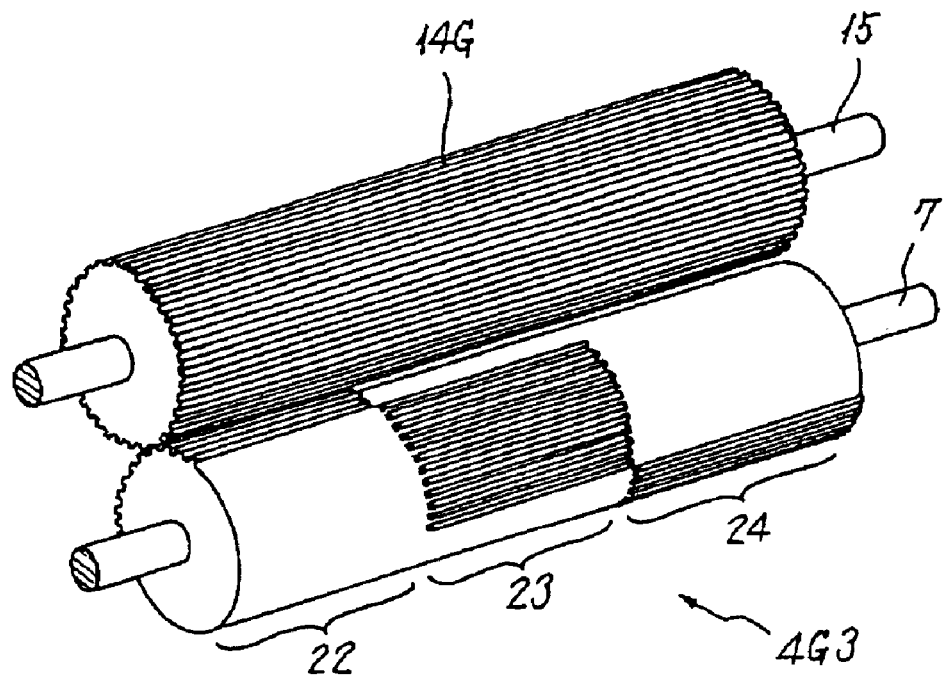
FIG. 15 is a perspective view of the driving gear and the driven gear.

This example is provided, as shown in FIG. 15, by dividing the driven gear 4G3 engaged with the driving gear 14G into three areas 22, 23, and 24 in the longitudinal direction of its shaft, and gear portions (teeth-omitted portions) are allocated to and arranged on the peripheral surface of each divided area so that the portions are complemented by each other. In this example, a gear portion by ⅓ of one circumference and a teeth-omitted portion by remaining ⅔ of the circumference are provided for each divided area.

A portion indicated by legend 22G on the area 22, a portion indicated by legend 23G on the area 23, and a portion indicated by legend 24G on the area 24 are gear portions, and the remaining portions are teeth-omitted portions, respectively. In this example, the engagement position is shifted as the gear rotates in the longitudinal direction of the shaft, which makes it possible to periodically change the pressurizing force Pb in the same manner as that of the example 1.

[2]-1b. Length Variable Unit Formed with a Gear Having Different Tooth Widths

Figure 16:
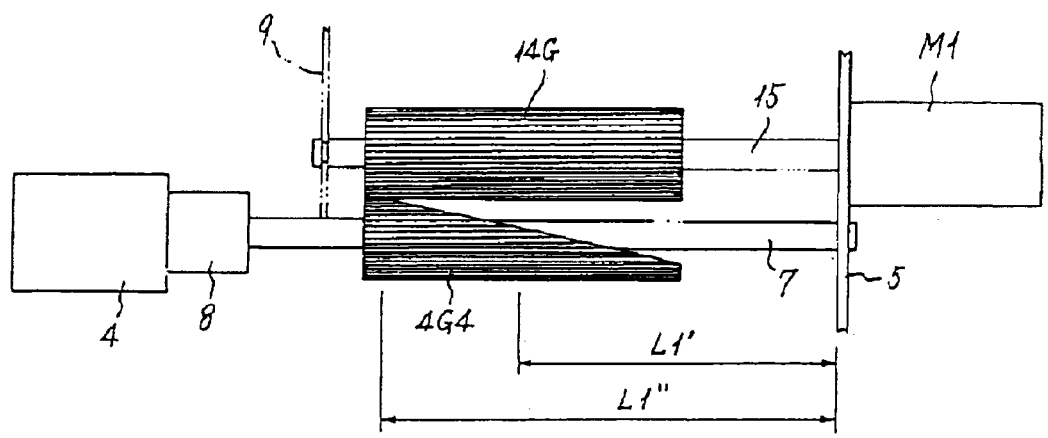
FIG. 16 is a plan view showing an example of the length variable unit.

This example will be explained with reference to FIG. 16 and FIG. 17. FIG. 16 corresponds to the figure when the structure is viewed from the top in FIG. 2. The members corresponding to the reverse roller 4, main body frame 5, torque limiter 8, shaft 7, shaft 15, and the motor M1 in FIG. 2 are also indicated by the same legends in FIG. 16 for convenience in explanation.

In this example, the length variable unit comprises the driving gear 14G disposed on the shaft 15 and the driven gear 4G4 disposed on the shaft 7. Regarding these driving gear 14G and driven gear 4G4, the length of the driving gear 14G on the shaft 15 is the same as the length of the driven gear 4G4 on the shaft 7. The driven gear 4G4 is formed with a gear with different tooth widths such that left ends of the teeth on a pitch circuit in a direction of the teeth width are aligned and the right ends in the direction of the teeth width are formed so as to become gradually wider and then gradually narrower during one round from a given position on the pitch circle.

To be further explained, assuming that a gear having a tooth width in the longitudinal direction of the shaft 7 and being cylindrical in its outline is cut along one virtual plane intersecting the shaft 7 at an acute angle, the driven gear 4G4 as the gear with different tooth widths is a gear with an inclined plane that is formed with one given gear, as a main element, of the two gears divided through the cutting.

In the driven gear 4G4 of this example, the length from the central position of engagement with the driving gear 14G to the main body frame 5 varies from L1' to L1" during one rotation of this driven gear 4G4.

Figure 17:
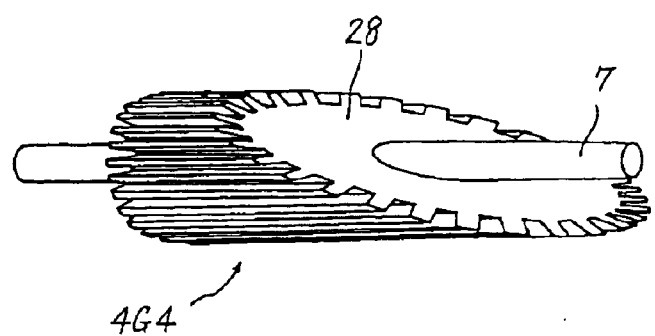
FIG. 17 is a perspective view showing an example of the driven gear.

Although the driven gear 4G4 as shown in FIG. 16 and FIG. 17 has a shape being linearly and slantingly cut, the driving gear 14G may have a shape of being slantingly cut and the driven gear 4G4 may be an ordinary slim gear the same as the driving gear 14G.

In any of the examples, the case where the gear is linearly and slantingly cut is explained. This case is useful for changing an engagement width and moving an action point of the averaged drive transmission. Therefore, it does not matter at all that the gear may be cut curvedly.

Figure 18:
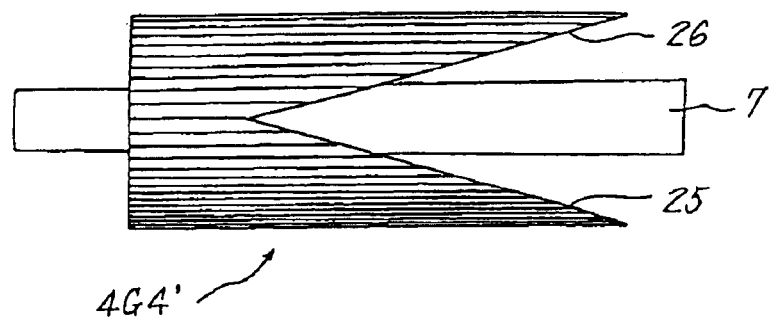
FIG. 18 is a front view showing an example of the driven gear.

Further, as shown in FIG. 18, the gear may be also formed with a driven gear 4G4' having a shape obtained by opposing and combining shapes slantingly cut with each other. In this case, two inclined planes are formed in one gear, so that the number of fluctuation cycles of the pressurizing force Pb during one rotation is more than that of the FIG. 16 and FIG. 17, and the sheet separating capability becomes sufficient.

In this example, the pressurizing force Pb of the reverse roller varies continuously in a sinusoidal waveform as shown in FIG. 11 in any of the examples.

[2]-1c. Length Variable Unit Formed with a Gear Having a Constant Tooth Width

Figure 19:
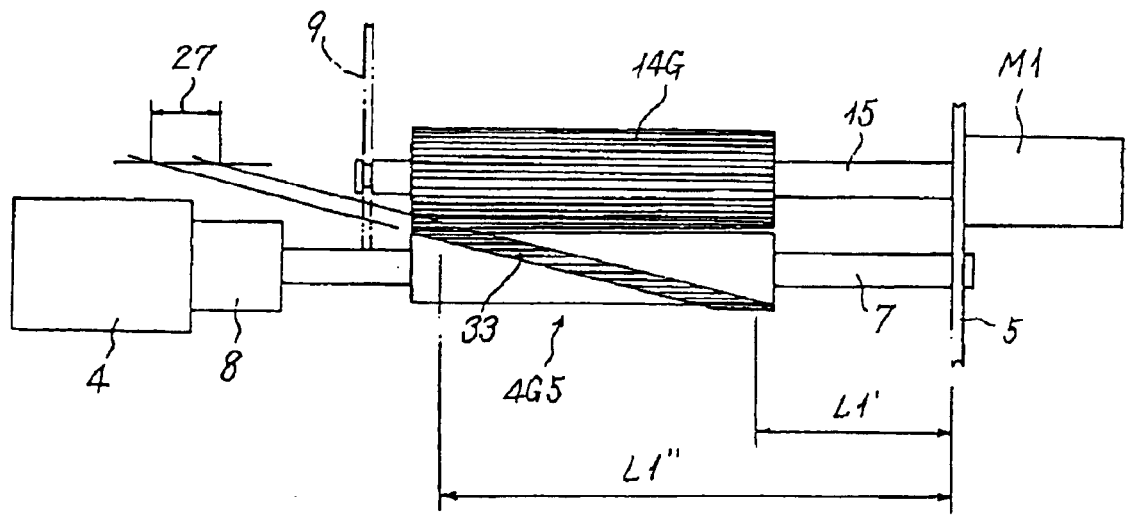
FIG. 19 is a plan view showing an example of the length variable unit.

This example will be explained with reference to FIG. 19 and FIG. 20. FIG. 19 corresponds to the figure when the structure is viewed from the upper side in FIG. 2. The members corresponding to the reverse roller 4, main body frame 5, torque limiter 8, shaft 7, shaft 15, and the motor M1 in FIG. 2 are also indicated by the same legends in FIG. 19 for convenience in explanation.

In this example, the length variable unit comprises the driving gear 14G disposed on the shaft 15 in FIG. 12 and FIG. 13 and the driven gear 4G5 disposed on the shaft 7. This driven gear 4G5 is a gear with a constant tooth width in which the teeth on its pitch circuit are displaced from one another along the longitudinal direction of the supporting shaft while each tooth width 27 on the pitch circuit is kept constant.

Assuming that a gear having a tooth width in the direction of the shaft 7 and being cylindrical in its outline is cut along two virtual planes in parallel each intersecting the shaft 7 at an acute angle, this gear with a constant tooth width is formed with a slantingly-sliced-like gear, as a main element, having a shape of gear sandwiched by two virtual planes of three gears divided through the cutting.

In such a slantingly-sliced gear, an engagement position of the driven gear 4G5 with respect to the driving gear 14G, that is, a length from the main body frame 5 periodically varies between L1' and L1" as the driving gear 14G rotates. That is, in the examples in FIG. 16 and FIG. 17, the amount of shifting of the engagement position is a length of ½ of the driving gear 14G, but in this example, it is possible to shift the engagement position within the range of the whole width of the driving gear 14G by the driven gear 4G5 with a simple shape.

In the example, although the driven gear is formed with the gear with a constant tooth width which is the slantingly sliced gear, the driving gear may be formed with the gear with a constant tooth width which is the slantingly sliced gear. In the examples shown in FIG. 19 and FIG. 20, the teeth are slantingly and linearly arranged with respect to the shaft, but this is useful for shifting the action point of the drive transmission by changing the engagement position, so that it does not matter at all that the gear may be curvedly arranged.

Figure 21:
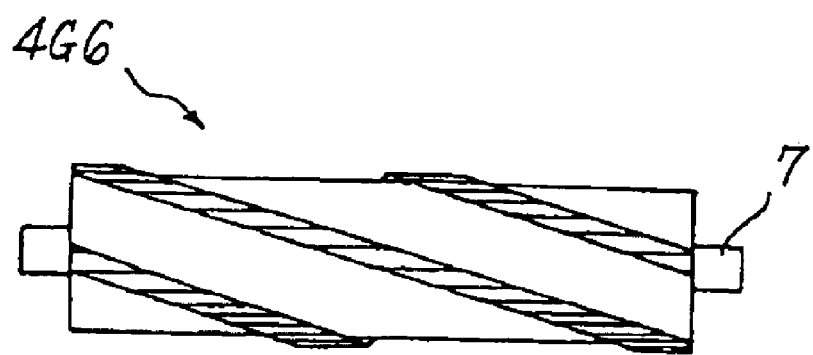
FIG. 21 is a front view showing an example of the driven gear.

Although a single thread of gear with a constant tooth width is provided on one gear in the example, the arrangement is not limited to this example. For example, as shown in FIG. 21, a driven gear 4G6 may have plural threads of gears each with a constant tooth width like a multi-thread screw. In this case, the length can be varied many times for one rotation of the driven gear 4G6.

[2]-1d. Manufacturing Method of Gears

Figure 20:
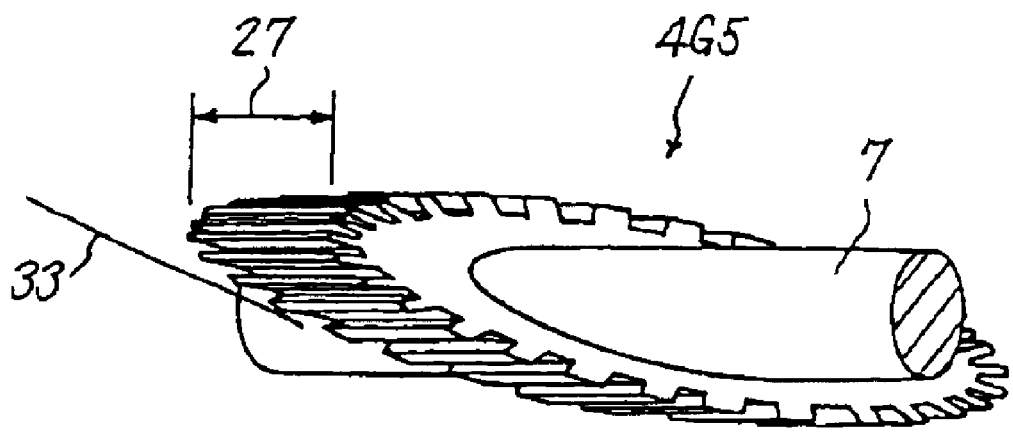
FIG. 20 is a perspective view showing an example of the driven gear.

The driven gear 4G3 in FIG. 12 to FIG. 14B, the driven gear 4G3 in FIG. 15, the driven gear 4G4 in FIG. 16 and FIG. 17, the driven gear 4G4' in FIG. 18, the driven gear 4G5 in FIG. 19 and FIG. 20, and the driven gear 4G6 in FIG. 21 can be manufactured through machining as metal products. However, the manufacturing method through injection molding with resin is suitable for mass production.

As shown in FIG. 16 and FIG. 17, assuming that a gear having a tooth width in the longitudinal direction of the shaft 7 and being cylindrical in its outline is cut along one virtual plane intersecting the shaft 7 at an acute angle, the driven gear 4G4 in the above-mentioned example is a gear that is formed with one given gear, as a main element, of the two gears divided through the cutting. This virtual plane corresponds to the side face 28 of the gear in FIG. 17.

Figure 22A:
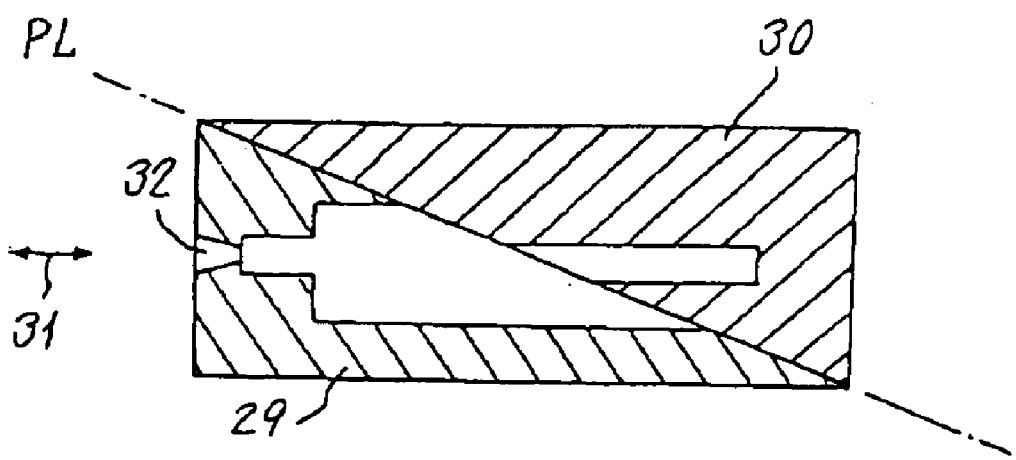
FIG. 22A and FIG. 22B are cross-sectional views of the mold.

Molds 29 and 30 with this virtual plane as a dividing plane PL in FIG. 22A are produced. This mold 29 is a movable mold that can move in the direction of the shaft 7 in FIG. 16 and FIG. 17 as indicated by the arrow 31, while the mold 30 is a fixed mold. These molds are closed, and resin is press-fitted and injected through a gate 32 to mold the driven gear 4G4.

The driven gear 4G5 in the example has the gear portion projected, which is a shape hard to be extracted from the mold. That is, as shown in FIG. 19 and FIG. 20, assuming that a gear having a tooth width in the direction of the shaft 7 and being cylindrical in its outline is cut along two virtual planes in parallel each intersecting the supporting shaft at an acute angle, this driven gear 4G5 has a shape corresponding to the gear sandwiched by the two virtual planes of the three gears divided through the cutting. The side face 33 of the gear in FIG. 20 corresponds to one of the virtual planes.

Figure 22B:
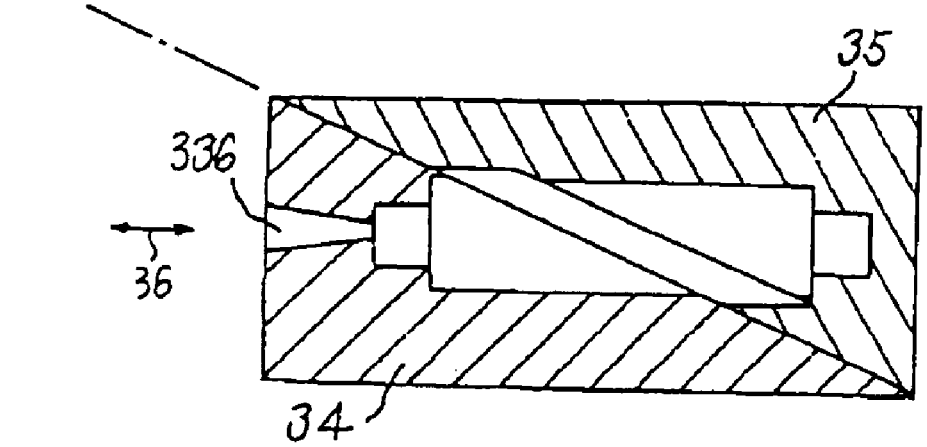

A mold with this virtual plane as a dividing plane PL as shown in FIG. 22B is produced. This mold 34 is a movable mold that can move in the direction of the shaft 7 in FIG. 19 and FIG. 20 as indicated by the arrow 36, while the mold 35 is a fixed mold. These molds are closed, and resin is press-fitted and injected through a gate 336 to mold the driven gear 4G5. By setting the dividing plane to PL, a resin product can be easily extracted from the mold.

In these examples, respective virtual planes are set to dividing planes and the mold is designed to open/close in the longitudinal direction of the shaft, which allows integral molding with resin, thus achieving reduction in cost by mass production.

[2]-2. Length Variable Unit Formed with a Shifting Unit

In the example explained below, the length variable unit relates to a sheet feeding apparatus which has a shifting unit, as a main element, for sliding the driven gear 4G in FIG. 2 along the shaft 7 supporting the driven gear 4G in A the longitudinal direction of the shaft 7, or which has a shifting unit, as a main element, for sliding the driving gear 14G along the shaft 15 in its longitudinal direction.

The length variable unit is formed with the shifting unit like in this example, so that the length L1 from the main body frame 5 to the engagement position is varied to change the pressurizing force Pb when the shifting unit is put into an active state. If the shifting unit is inactive, the pressurizing force Pb is constant. Therefore, it is possible to select whether the pressurizing force Pb is changed or not by controlling switching between operation and non-operation of the shifting unit according to a type of paper. Since a variation of the length L1 means that a mechanical load is put on a supporting system of the reverse roller 4 supported in a cantilever state, there is no need to vary the length L1 if the type of paper is excellent in sheet separating capability.

[2]-2a. Example Using a Disk Cam

Figure 23:
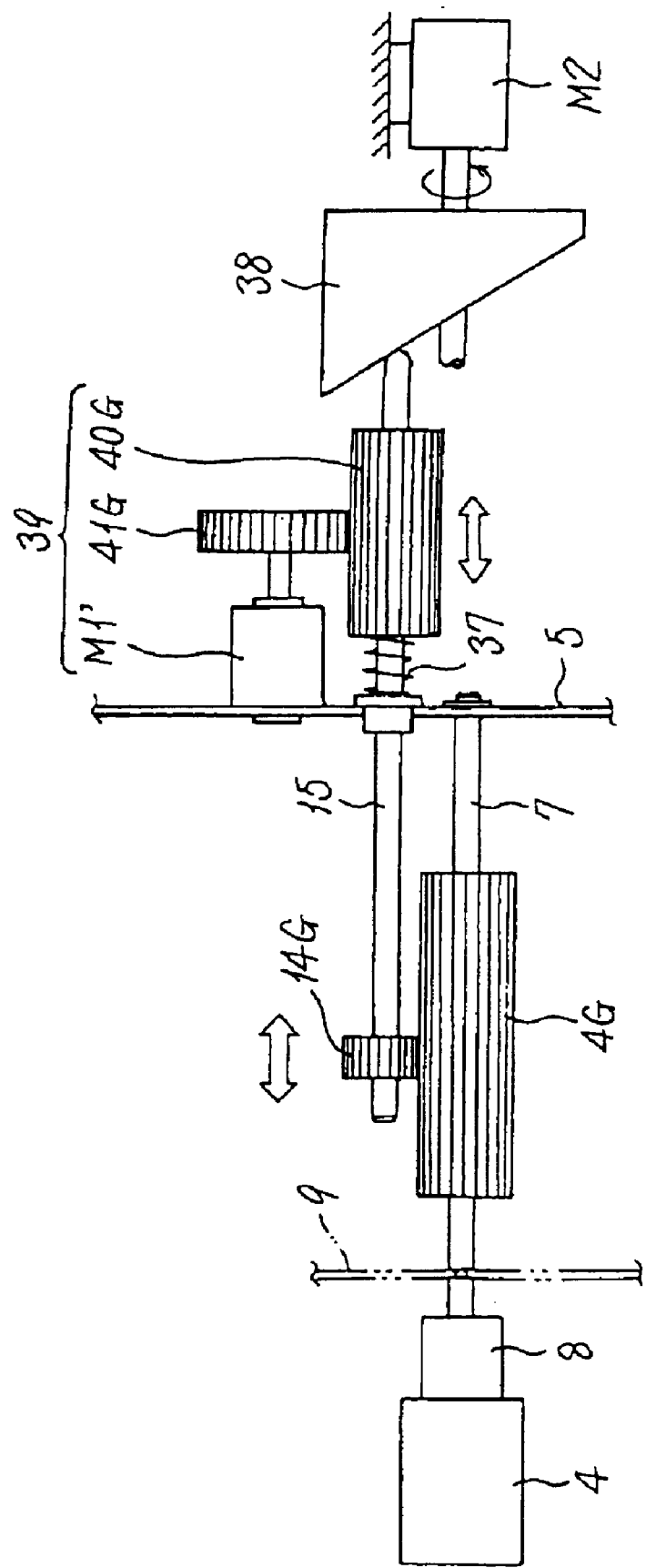
FIG. 23 is a plan view showing an example of the length variable unit with the shifting unit.

This example has a structure, as shown in FIG. 23, such that the driving gear 14G is slid integrally with the shaft 15 in its longitudinal direction, and the shifting unit comprises the extendable spring 37 as a biasing unit that biases the shaft 15 in its longitudinal direction, disk cam 38 disposed at the position preventing movement of the shaft 15 due to this spring 37, and the driving unit 39 that applies a rotational driving force to the shaft 15. The disk cam 38 is rotated by a motor M2. The shaft 15 is supported slidably in its axial direction and rotatably provided at a through section of the main body frame 5.

The engagement position between the driving gear 14G and the driven gear 4G can be shifted from the main body frame 5 by the shifting unit using such a disk cam 38 and a spring 37 as a biasing unit, and the pressurizing force Pb can be periodically changed. This example is formed with a combination of ordinary mechanical components, so that production is easy.

The driving unit 39 comprises a driven-side gear 40G fixed to the shaft 15, a driving-side gear 41G engaged with this driven-side gear 40G, and a motor M1'. The driven-side gear 40G is integral with the shaft 15, therefore, the driven-side gear 40G is supposed to have a length in the axial direction longer than the length of shifting of the engagement position between the driving gear 14G and the driven gear 40G by the disk cam 38. Accordingly, the engaging state with the driving-side gear 41G is ensured. Based on the structure of such gears, it is possible to transfer torque reliably to the shaft 15 that reciprocates in the axial direction.

In this example, the shifting unit is formed on the driving gear 14G with the driven gear 4G not to be slid. Conversely to this, it is also possible to form the shifting unit on the driven gear 4G with the driving gear 14G not to be slid.

[2]-2b. Example of Sliding the Gear Held by a Holding Member

Figure 24A:
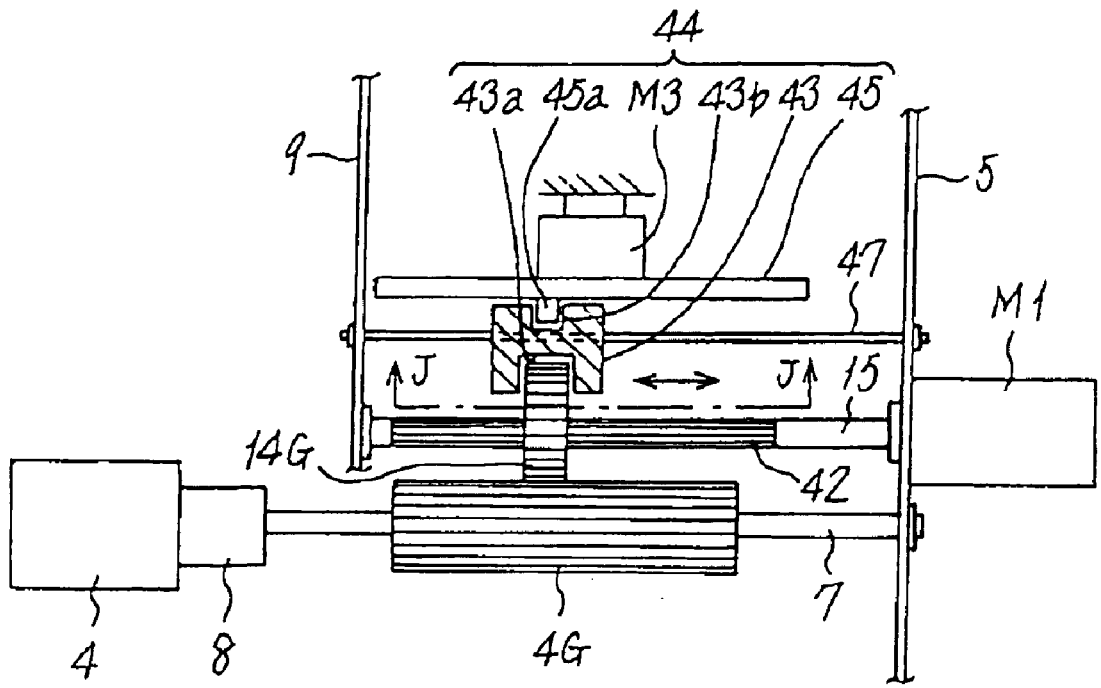
FIG. 24A is a plan view showing an example of the length variable unit with the shifting unit.
Figure 24B:
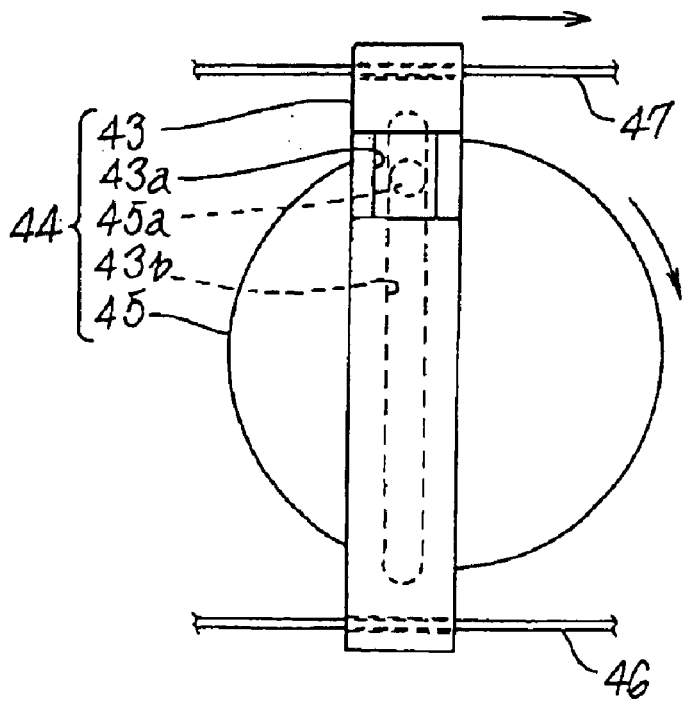
FIG. 24B is a view when viewed from the direction indicated by J—J in FIG. 24A.

In this example, as shown in FIG. 24A and FIG. 24B, a gear that is slid in the longitudinal direction of the shaft 15 is set as the driving gear 14G, and this driving gear 14G is mounted slidably the shaft 15 in its longitudinal direction through a spline section 42 as a rotation preventing unit formed on the shaft 15.

The shifting unit is formed with a holding member 43 reciprocatively movable in a state of holding the driving gear 14G with a groove 43a through restriction of its moving direction to the longitudinal direction of the shaft 15, and a reciprocating unit 44 that reciprocates this holding member 43 in the longitudinal direction of the shaft 15.

In this example, the reciprocating unit 44 moves the holding member 43 that holds the driving gear 14G, so that it is possible to place the reciprocating unit 44 within the range of the length of the shaft 15, thus avoiding upsizing of the apparatus.

The reciprocating unit 44 is structured with a groove 43b formed on the holding member 43 and having a length in a direction perpendicular to the longitudinal direction of the shaft 15, a projection part 45a engaged with this groove 43b, and a circular motion unit that provides circular motion to this projection part 45a. The circular motion unit comprises a rotary disk 45 driven by a motor M3 and the projection part 45a projected at a position eccentric from a center of rotation. The holding member 43 is slidable along the longitudinal direction of the shaft 15 guided by guide bars 46, 47 provided between the main body frame 5 and the auxiliary side plate 9.

Based on this structure, the projection part 45a performs circular motion according to rotation of the motor M3, and the holding member 43 reciprocates in the longitudinal direction of the shaft 15 according to the movement of this projection part 45*a*. Accordingly, the driving gear 14G also shifts in the longitudinal direction of the shaft 15, therefore, the engagement position between the driving gear 14G and the driven gear 4G shifts.

As explained above, the reciprocating unit 44 is formed with the groove 43*b*, projection part 45*a*, and the rotary disk 45 to convert circular motion to reciprocal motion. If a speed-variable motor is used as the motor M3, the fluctuation cycle of the pressurizing force Pb is made variable without changing in the rotational speed of the reverse roller 4.

In this example, the shifting unit is formed on the side of the driving gear 14G and the driven gear 4G does not slide. Conversely to this, it is also possible to form the shifting unit on the side of the driven gear 4G with the driving gear 14G not to be shifted.

[3] Example of the Application to Image Formation Apparatus

An example of an image formation apparatus to which the sheet feeding apparatus in each of the examples can be applied will be explained below. In FIG. 25, the image formation apparatus comprises three blocks such as the image reading section 80 to which so-called ADF (auto-document feeder) is applied, image forming section 81, and the sheet storage section 82 from its upper side. Legend 83 represents a post-processing device such as a stapler accompanying the image formation apparatus, and legend 84 represents a high volume sheet feeding device.

The image reading section 80 automatically reads a document image and converts the read-in information to electric signals to transfer the signals to a control unit for writing.

In the image forming section 81, a circumferential part of an image carrier 50 provided with a photosensitive layer around a circumferential surface of a drum-like rotor forms a surface to be scanned by an optical writing unit. An charging roller as a charging unit not shown, an optical scanning device 51 as an optical writing device, a developing device 53, a conveyer belt 54, and a cleaning unit 55 are disposed around the image carrier 50 in order of a rotating direction as a clockwise direction indicated by the arrow.

The image carrier 50 is irradiated with a light beam from the optical scanning device 51 after charged by the charging roller, image information is scanned in a main scanning direction in parallel with a direction of the rotation axis of the image carrier 50 (a direction perpendicular to a paper surface), and an electrostatic latent image is formed on the image carrier 50.

A transfer roller (not shown) as a transfer unit is in contact with the bottom part of the image carrier 50 through the conveyer belt 54. This contact part is a transfer part. A fixing device 58 is disposed on the left side of the conveyer belt 54, and a sheet discharging unit 59 is disposed on the further left side. The sheet discharging unit 59 reverses a sheet for double-sided image formation to convey the sheet to the transfer part again, or conveys the sheet to the post-processing device 83.

These charging roller (not shown), optical scanning device 51, developing device 53, transfer roller not shown, cleaning unit 55, and fixing device 58 around the image carrier 50 constitute the key section of the image forming unit.

The sheet storage section 82 has four sheet feeding trays 90*a*, 90*b*, 90*c*, and 90*d* from the top so that this section can handle any different sizes or types of paper. Four sheet feeding devices 57*a*, 57*b*, 57*c*, and 57*d* from the top corresponding to these sheet feeding trays are disposed one on another in their vertical direction. Each of these four sheet feeding devices has the length variable unit having any of the structures in the examples. A sheet feeding device in the high volume sheet feeding device 84 has the length variable unit as well. Conveying paths indicated by the broken lines are led to the image forming section 81 from the respective sheet feeding devices.

The sheet feeding devices 57*a*, 57*b*, 57*c*, and 57*d* are mainly explained below. A conveying guide not shown is disposed so that a sheet is guided from each of these sheet feeding devices to resist rollers 85. For example, an uppermost sheet of the stacked sheets in the sheet feeding device 57*d* as a bottom one is separated by one and is conveyed to the transfer part provided at a position where the image carrier 50 contacts the conveyer belt 54 through the conveying guide and the resist rollers 85. The sheet is transferred with an image at the transfer part, and eventually discharged to the post-processing device 83 through the fixing device 58. As a conveying path, a path for manual feeding and a reversing path for double-sided images are added, but explanation of these paths is omitted because they are not directly related to this invention.

This image formation apparatus performs image formation in the following manner.

The image carrier 50 starts to rotate, and is negatively and uniformly charged by the charging roller in the dark during this rotation. A light beam is emitted and scanned, and electric charge of the light emitting section is removed to form an electrostatic latent image corresponding to the image to be created. This electrostatic latent image reaches the developing device 53 through rotation of the image carrier 50, where the latent image is visualized by toner to form a toner image.

The developing device 53 applies toner of positive polarity to the electrostatic latent image on the image carrier 50 to visualize this electrostatic latent image. The image forming system of this embodiment is co-called a negative-positive developing system, in which the image carrier 50 is negatively charged and the toner of positive polarity is used.

After the toner image is formed, a sheet is started to be fed by the pickup roller 2 at a predetermined sheet feeding timing, the sheet feed is once stopped at the position of the paired resist rollers 85 through the conveying path indicated by the broken line, and a feeding timing is waited so that the sheet coincides with the toner image on the image carrier 50 at the transfer part. The sheet stopped at the position of the resist rollers 85 is fed out the instant at which such an appropriate timing comes.

The tip end of the sheet fed out from the resist rollers 85 reaches the transfer part. The toner image on the image carrier 50 and the sheet meet at the transfer part, and the toner image is transferred to the sheet by an electric field produced by the transfer roller.

The sheet with the toner image transferred in such a manner then passes through the fixing device 58, during which the image is fixed by fixing rollers.

On the other hand, the residual toner, because some toner has not been transferred at the transfer part, remaining on the image carrier 50 reaches the cleaning unit 55 as the image carrier 50 rotates and passes through the cleaning unit 55, during which the residual toner is cleaned off, and the image carrier 50 is brought in to a standby status for the next image formation.

Figure 25:
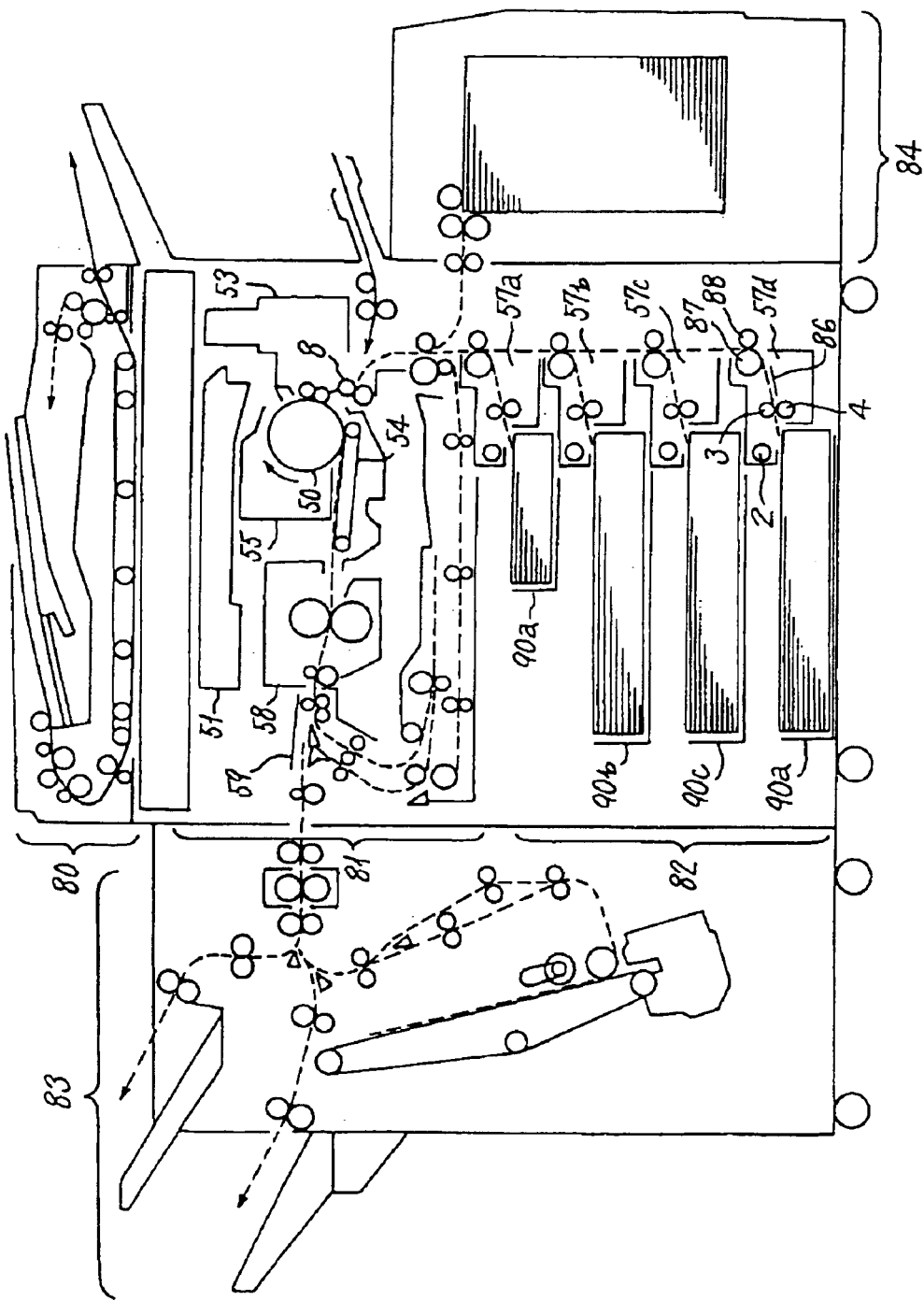
FIG. 25 is a front view showing an outline of the image formation apparatus accompanied with the devices.

In FIG. 25, each of the sheet feeding devices 57*a*, 57*b*, 57*c*, and 57*d* is the sheet feeding apparatus of the FRR system based on the structure of this invention, so that these devices have the same structure as this invention. For example, the sheet feeding device 57D has the guide 86 disposed at the position downstream of the nip part between the feed roller 3 and the reverse roller 4, and has a pair of conveying rollers 87 and 88 at the position downstream of the guide 86.

This example is formed with a unit obtained by integrally assembling the feed roller 3, reverse roller 4, guide 86, and the above-mentioned length variable unit. Thus, it is possible to provide the image formation apparatus with a high degree of sheet separating capability. The sheet feeding device composed of this unit is formed to a box, which is detachable from the main body of the image formation apparatus, thus being convenient for its maintenance.

By making the sheet feeding device detachable to the image formation apparatus like this example, maintenance of the members inside the sheet feeding device such as the feed roller 3, reverse roller 4 as the separating unit, guide 86, and the conveying rollers 87 and 88 can be easily performed by users and service persons. Further, the processing for a paper jam occurring at the sheet feeding part of the image formation apparatus can easily be performed.

As explained above, the example shown in FIG. 25 is a monochrome image formation apparatus, but a color image formation apparatus can also obtain the same sheet separating-feeding capability by using the sheet feeding apparatus to which the length variable unit according to this invention is applied.

[4] Sheet Feeding Method

In the image formation apparatus explained with reference to FIG. 25, assume that plain paper is stored in the sheet feeding tray 90a, for example, and smooth special paper such as second original drawing, calendered paper, or OPC forms is stored in the sheet feeding tray 90a.

In this case, in the strict sense, the case, in which shifting of the engagement position between the driving gear 14G and the driven gear 4G by the shifting unit in the length variable unit as explained in each of the examples and periodical changing of pressurizing force Pb are really needed, is only the case of feeding the special paper.

On the other hand, in the example explained with reference to FIG. 23 and the example explained with reference to FIG. 24, each in which the length variable unit is formed with the shifting unit, any of the units uses the dedicated motor to drive the shifting unit other than the driving source for driving the reverse roller 4.

For example, the example explained with reference to FIG. 23 has the motor M2 used only to shift the driving gear 14G other than the motor M1' used to drive the reverse roller 4.

Further, the example explained with reference to FIG. 24 has the motor M3 used only to shift the driving gear 14G other than the motor M1 used to drive the reverse roller 4.

As explained above, in the example where the power source dedicated to the shifting unit for periodically changing pressurizing force Pb is discretely provided other than the driving source for the reverse roller 4, wasteful power consumption will be eliminated and consumption of components will be reduced if the motor M2 or motor M3 is driven at the time of separating and feeding sheets only when the sheet feeding tray 90b with the special paper stored is selected, and if the motor M2 or the motor M3 is not driven when any of the sheet feeding trays 90a, 90c, and 90d where plain paper is stored is selected.

Figure 26:
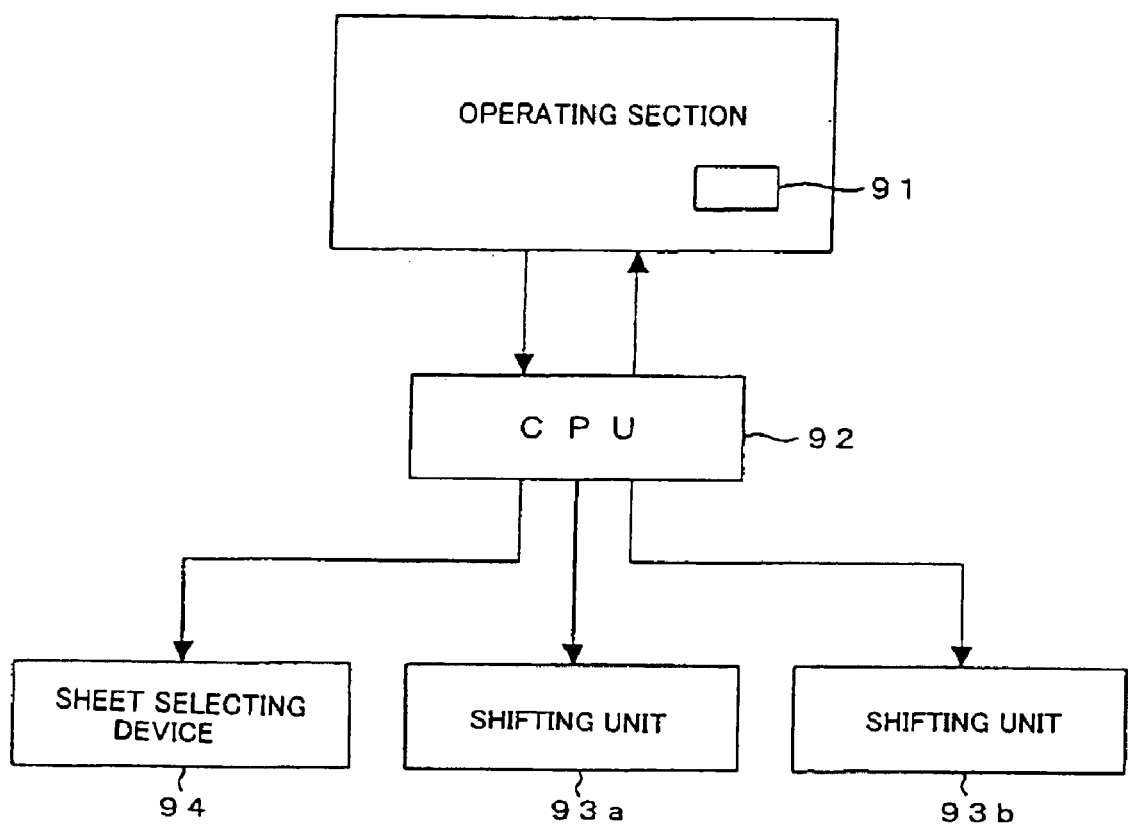
FIG. 26 is a block diagram used to perform the sheet feeding method in the image formation apparatus.

To solve the problem, in this example, it is designed that operation or non-operation of the length variable unit is controlled according to a switching operation. As an example, in FIG. 26, driving or non-driving of the motor M2 or the motor M3 is automatically controlled in association with selection of a sheet by the sheet selection switch 91 provided on the operating part of the image formation apparatus.

The CPU 92 sends a signal to the sheet selection device 94 if the sheet selected by the sheet selection switch 91 is plain paper, and brings the members into an active state so as to feed out a sheet from the sheet feeding tray 90a where the plain paper selected by the sheet selection switch 91 is stored. At the same time, the CPU 92 also controls a shifting unit 93a of the selected sheet feeding device 57a so that the motor M2 or the motor M3 will not be driven at the time of separating and feeding sheets.

Further, the CPU 92 sends a signal to the sheet selection device 94 if the sheet selected by the sheet selection switch 91 is special paper, and brings the members into an active state so as to feed out a sheet from the sheet feeding tray 90b where the special paper selected by the sheet selection switch 91 is stored. At the same time, the CPU 92 also controls a shifting unit 93b of the selected sheet feeding device 57b so that the motor M2 or the motor M3 explained in FIG. 23 and FIG. 24 is brought into a driving state at the time of separating and feeding sheets.

By controlling in such manners, the shifting unit is not functioned in the case of the plain paper having not much difficulty in paper separation, while the shifting unit is functioned only in the case of the special paper having difficulty in paper separation. Therefore, the driving time of the motor dedicated to the shifting unit is reduced as compared to the case of controlling so that the shifting unit is brought into an active state irrespective of paper types.

As explained above, according to one aspect of this invention, it is easy to periodically change pressurizing force of the reverse roller against the feed roller. Accordingly, it is also possible to reliably separate and feed special paper such as smooth paper used for color copy paper and second original drawing or OPC paper as is the case of plain paper.

Moreover, the length variable unit periodically varies a length from the fulcrum to the engagement part to change the pressurizing force Pb. Accordingly, it is also possible to reliably separate and feed special paper such as smooth paper having an inter-sheet adhesive force stronger than that of plain paper as is the case of plain paper.

Furthermore, the pressurizing force can be periodically changed without using a particular driving unit.

Moreover, the teeth-omitted gears are arranged in a relation that their teeth-omitted portions are complemented by each other, so that it is possible to periodically vary a length from the fulcrum to the engagement position by the amount corresponding to the length between the teeth-omitted gears.

Furthermore, the number of variations of the length per rotation is increased, thus being preferable for separating capability.

Moreover, impact at the time of switching engagement is low, thus being advantageous against noise.

Furthermore, by integrally forming the teeth-omitted gears in which their teeth-omitted portions are complemented by each other, assembly is easy.

Moreover, by forming a plurality of inclined planes in one gear, a fluctuation cycle of the pressurizing force of the reverse roller during rotation of the gear is increased, which makes it possible to increase the separating capability. Further, the pressurizing force of the reverse roller fluctuates in a sinusoidal waveform, thus obtaining smooth power transmission with less noise. This apparatus has a simple form, thus being easily manufactured.

Furthermore, an engagement position can be varied within a range of a whole gear width of the gear with a constant tooth width.

Moreover, an engagement position can be varied by using gears with a simple shape.

Furthermore, by controlling switching between operation and non-operation of the shifting unit according to paper types, it is possible to select whether the pressurizing force Pb is to be changed or not to be changed, thus avoiding damage to components due to unnecessary use.

Moreover, an engagement position can be varied by a structure of components which are easily manufactured. Accordingly, it is possible to securely transmit torque to the shaft that reciprocates in its longitudinal direction.

Furthermore, upsizing of the apparatus can be avoided.

Moreover, by changing a reciprocating speed, it is possible to shift an engagement position and change a fluctuation cycle of the pressurizing force without changing the rotational speed of the reverse roller.

Furthermore, it is possible to provide the image formation apparatus with a high degree of separating capability.

Moreover, the gears can be mass-produced by resin molding, thus reducing the cost.

Furthermore, resin molding becomes possible, thus reducing the cost through mass production.

Moreover, the driving time of the motor dedicated to the shifting unit is reduced as compared to the case of controlling so that the shifting unit is brought into an active state irrespective of paper types, thus reducing power consumption and consumption of components.

The present document incorporates by reference the entire contents of Japanese priority documents, 2000-249953 filed in Japan on Aug. 21, 2000 and 2000-213182 filed in Japan on Jul. 13, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A sheet feeding apparatus comprising:
   a feed roller;
   a cantilever shaft;
   a plurality of driven gears disposed on the cantilever shaft, at least one driven gear having first and second pairs of adjacent teeth of a same set of teeth, the first pair of adjacent teeth separated by a first gap and the second pair of adjacent teeth separated by a second gap less than the first gap;
   a plurality of driving gears configured to drive the plurality of driven gears, at least one driving gear comprising a set of teeth adapted to engage the first and second pairs of adjacent teeth to drive the at least one driven gear; and
   a reverse roller pressed into contact with the feed roller, the reverse roller supported on an end of the cantilever shaft and adapted to be rotated in a sheet feeding direction and a reverse direction and to separate and convey sheet media held between said feed roller and said reverse roller.

2. The sheet feeding apparatus according to claim 1, wherein the plurality of driven gears comprises first and second driven gears each including a teeth-omitted gear that has a teeth-omitted portion, where teeth are omitted on a circumference, and teeth-omitted gears are arranged so that teeth-omitted portions are complemented by each other.

3. A sheet feeding apparatus which feeds sheet media, comprising:
   a feed roller;
   a reverse roller, which is pressed into contact with said feed roller, is provided by being elastically supported upward by a free end of a cantilever shaft adapted to integrally rotate with a driven gear engaging a driving gear and through a torque limiter, the reverse roller adapted to be rotated in a sheet feeding direction and a reverse direction, and to separate and convey said sheet media held between said feed roller and said reverse roller one by one by utilizing differences in friction coefficients among said feed roller, said reverse roller, and said sheet media; and
   a length variable unit having a variable length, based on such conditions that a position of an engagement part and a rotational direction of said driving gear are determined so that teeth surfaces of said driven gear undergo an upward force of a pressurizing force by said driving gear based on said engagement part as an action point of force, and the pressurizing force of said reverse roller against said feed roller is periodically changed by varying said length from a fulcrum, which is a cantilever supporting part of said cantilever shaft, to an action point of the force,
   wherein said length variable unit is integrally formed with said driving gear or said driven gear,
   said length variable unit comprises a group of driving gears formed with a plurality of gears arranged at intervals on a driving gear supporting shaft that supports said driving gear, and a group of driven gears formed with a plurality of gears arranged at intervals on a driven gear supporting shaft that supports said driven gear, and
   each gear forming either one of these groups of driving gears and driven gears is a teeth-omitted gear that has a teeth-omitted portion, where teeth are omitted on a circumference, and teeth-omitted gears are arranged so that teeth-omitted portions are complemented by each other.

4. The sheet feeding apparatus according to claim 3, wherein one gear has a plurality of said teeth-omitted portion.

5. The sheet feeding apparatus according to claim 3, wherein a tooth Y next to a teeth-omitted portion in one of said teeth-omitted gears and a tooth Z at a position of the nearest phase to said tooth Y of teeth next to teeth-omitted portions in another teeth-omitted gear are simultaneously engaged with respective opposite gears.

6. The sheet feeding apparatus according to claim 3, wherein a plurality of teeth-omitted gears forming said group of gears are integrally formed.

7. An image formation apparatus comprising:
   a sheet feeding apparatus adapted to feed sheet media; and
   an image forming unit adapted to form an image on the sheet media fed by said sheet feeding apparatus,
   wherein said sheet feeding apparatus comprises:
   a feed roller;

a cantilever shaft;
a plurality of driven gears disposed on the cantilever shaft, at least one driven gear having first and second pairs of adjacent teeth of a same set of teeth, the first pair of adjacent teeth separated by a first gap and the second pair of adjacent teeth separated by a second gap less than the first gap;
a plurality of driving gears configured to drive the plurality of driven gears, at least one driving gear comprising a set of teeth adapted to engage the first and second pairs of adjacent teeth to drive the at least one driven gear; and
a reverse roller pressed into contact with the feed roller, the reverse roller supported on an end of the cantilever shaft and adapted to be rotated in a sheet feeding direction and a reverse direction and to separate and convey sheet media held between said feed roller and said reverse roller.

8. The image formation apparatus according to claim 7, wherein the plurality of driven gears comprises first and second driven gears each including a teeth-omitted gear that has a teeth-omitted portion, where teeth are omitted on a circumference, and teeth-omitted gears are arranged so that teeth-omitted portions are complemented by each other.

9. A sheet feeding method comprising the steps of:
feeding sheet media between a feed roller and a reverse roller pressed into contact with said feed roller, the reverse roller adapted to be rotated by a plurality of driven gears driven by a plurality of driving gears and to separate and convey said sheet media held between said feed roller and said reverse roller; and
engaging first and second pairs of adjacent teeth of a same set of teeth of at least one driven gear with a set of teeth of at least one driving gear, the first pair of adjacent teeth separated by a first gap and the second pair of adjacent teeth separated by a second gap less than the first gap.

10. The sheet feeding method according to claim 9, wherein the plurality of driven gears comprises first and second driven gears each including a teeth-omitted gear that has a teeth-omitted portion, where teeth are omitted on a circumference, and teeth-omitted gears are arranged so that teeth-omitted portions are complemented by each other.

11. A sheet feeding apparatus comprising:
a feed roller;
a cantilever shaft;
at least one driven gear disposed on the cantilever shaft, the at least one driven gear having first and second pairs of adjacent teeth of a same set of teeth, the first pair of adjacent teeth separated by a first gap and the second pair of adjacent teeth separated by a second gap less than the first gap;
at least one driving gear comprising a set of teeth adapted to engage the first and second pairs of adjacent teeth to drive the at least one driven gear; and
a reverse roller pressed into contact with the feed roller, the reverse roller supported on an end of the cantilever shaft and adapted to be rotated in a sheet feeding direction and a reverse direction and to separate and convey sheet media held between said feed roller and said reverse roller,
wherein the at least one driven gear comprises first and second driven gears, and the at least one driving gear comprises first and second driving gears.

12. A sheet feeding apparatus comprising:
a feed roller;
a cantilever shaft;
at least one driven gear disposed on the cantilever shaft, the at least one driven gear having first and second pairs of adjacent teeth of a same set of teeth, the first pair of adjacent teeth separated by a first gap and the second pair of adjacent teeth separated by a second gap less than the first gap;
at least one driving gear comprising a set of teeth adapted to engage the first and second pairs of adjacent teeth to drive the at least one driven gear; and
a reverse roller pressed into contact with the feed roller, the reverse roller supported on an end of the cantilever shaft and adapted to be rotated in a sheet feeding direction and a reverse direction and to separate and convey sheet media held between said feed roller and said reverse roller,
wherein the at least one driven gear comprises first and second driven gears, and the at least one driving gear comprises first and second driving gears, the first and second driving gears adapted to engage and drive the respective first and second driven gears.

13. The sheet feeding apparatus according to claim 12, wherein the first driven gear has a first predetermined number of teeth, and the second driven gear has a second predetermined number of teeth, and at least one of the first and second predetermined number of teeth is less than a predetermined number of teeth of at least one of the first and second driving gears.

14. The sheet feeding apparatus according to claim 12, wherein the first driven gear has a first predetermined number of teeth, and the second driven gear has a second predetermined number of teeth, and each of the first and second predetermined number of teeth is less than a predetermined number of teeth of each of the first and second driving gears.

15. A image formation apparatus comprising:
a sheet feeding apparatus adapted to feed sheet media; and
an image forming unit adapted to form an image on the sheet media fed by said sheet feeding apparatus,
wherein said sheet feeding apparatus comprises:
a feed roller;
a cantilever shaft;
at least one driven gear disposed on the cantilever shaft, the at least one driven gear having first and second pairs of adjacent teeth of a same set of teeth, the first pair of adjacent teeth separated by a first gap and the second pair of adjacent teeth separated by a second gap less than the first gap;
at least one driving gear comprising a set of teeth adapted to engage the first and second pairs of adjacent teeth to drive the at least one driven gear; and
a reverse roller pressed into contact with the feed roller, the reverse roller supported on an end of the cantilever shaft and adapted to be rotated in a sheet feeding direction and a reverse direction and to separate and convey sheet media held between said feed roller and said reverse roller,
wherein the at least one driven gear comprises first and second driven gears, and the at least one driving gear comprises first and second driving gears.

16. An image formation apparatus comprising:
a sheet feeding apparatus adapted to feed sheet media; and
an image forming unit adapted to form an image on the sheet media fed by said sheet feeding apparatus,
wherein said sheet feeding apparatus comprises:

a feed roller;

a cantilever shaft;

at least one driven gear disposed on the cantilever shaft, the at least one driven gear having first and second pairs of adjacent teeth of a same set of teeth, the first pair of adjacent teeth separated by a first gap and the second pair of adjacent teeth separated by a second gap less than the first gap;

at least one driving gear comprising a set of teeth adapted to engage the first and second pairs of adjacent teeth to drive the at least one driven gear; and a reverse roller pressed into contact with the feed roller, the reverse roller supported on an end of the cantilever shaft and adapted to be rotated in a sheet feeding direction and a reverse direction and to separate and convey sheet media held between said feed roller and said reverse roller, wherein the at least one driven gear comprises first and second driven gears, and the at least one driving gear comprises first and second driving gears, the first and second driving gears adapted to engage and drive the respective first and second driven gears.

17. The image formation apparatus according to claim 16, wherein the first driven gear has a first predetermined number of teeth, and the second driven gear has a second predetermined number of teeth, and at least one of the first and second predetermined number of teeth is less than a predetermined number of teeth of at least one of the first and second driving gears.

18. The image formation apparatus according to claim 16, wherein the first driven gear has a first predetermined number of teeth, and the second driven gear has a second predetermined number of teeth, and each the first and second predetermined number of teeth is less than a predetermined number of teeth of each of the first and second driving gears.

* * * * *